United States Patent
Mori et al.

(10) Patent No.: US 10,746,232 B2
(45) Date of Patent: Aug. 18, 2020

(54) CLUTCH DEVICE

(71) Applicant: ATS, Inc., Okayama (JP)

(72) Inventors: Shigemi Mori, Okayama (JP); Harunobu Morii, Okayama (JP)

(73) Assignee: ATS, INC., Okayama (JP)

( * ) Notice: Subject to any disclaimer, the term of this patent is extended or adjusted under 35 U.S.C. 154(b) by 107 days.

(21) Appl. No.: 16/315,880

(22) PCT Filed: Jul. 31, 2017

(86) PCT No.: PCT/JP2017/027789
§ 371 (c)(1),
(2) Date: Jan. 7, 2019

(87) PCT Pub. No.: WO2018/043000
PCT Pub. Date: Mar. 8, 2018

(65) Prior Publication Data
US 2019/0145469 A1  May 16, 2019

(30) Foreign Application Priority Data

Aug. 31, 2016 (JP) .................. 2016-170060

(51) Int. Cl.
*F16D 13/56* (2006.01)
*F16D 13/71* (2006.01)
(Continued)

(52) U.S. Cl.
CPC ............ *F16D 13/56* (2013.01); *F16D 13/52* (2013.01); *F16D 13/585* (2013.01); *F16D 13/64* (2013.01); *F16D 13/648* (2013.01); *F16D 13/71* (2013.01)

(58) Field of Classification Search
CPC .......... F16D 13/56; F16D 13/71; F16D 13/52; F16D 13/585; F16D 13/64; F16D 13/648
See application file for complete search history.

(56) References Cited

U.S. PATENT DOCUMENTS 4,556,133 A * 12/1985 Huber .................. F16D 13/46
                                                         192/70.16
5,715,920 A *  2/1998 Lindner ............... F16D 13/583
                                                         192/70.252
(Continued)

FOREIGN PATENT DOCUMENTS

EP          0023790       2/1981
GB          1221761       2/1971
(Continued)

OTHER PUBLICATIONS

Interview report with Japanese Patent Office.

*Primary Examiner* — Stacey A Fluhart
(74) *Attorney, Agent, or Firm* — Trojan Law Offices

(57) ABSTRACT

In a clutch device in which a diaphragm spring presses a pressure plate to have a friction disc pressed against a rotating part, a clutch device with which a half clutch condition is easily retained is provided. The clutch device comprises: a diaphragm spring comprising a plurality of plate springs arranged along a circumference having a rotation axis as a center wherein end portions thereof projecting toward the rotation axis constitute free ends; a pressure plate to cause the friction disc to be pressed against the rotating part by being biased by the diaphragm spring; and a release device to disconnect power from the rotating part to the friction disc by reducing bias force applied by the diaphragm spring to the pressure plate as the diaphragm spring is deformed by displacing free end portion side of the plate spring in one direction along the rotation axis.

21 Claims, 16 Drawing Sheets

(51) Int. Cl.
    *F16D 13/64*     (2006.01)
    *F16D 13/52*     (2006.01)
    *F16D 13/58*     (2006.01)

(56) References Cited

U.S. PATENT DOCUMENTS

| | | | | |
|---|---|---|---|---|
| 5,730,267 | A * | 3/1998 | Lopez | F16D 13/583 |
| | | | | 192/70.27 |
| 5,758,756 | A * | 6/1998 | Weiss | F16D 13/585 |
| | | | | 192/110 R |
| 7,954,618 | B2 * | 6/2011 | Fischer | F16D 13/583 |
| | | | | 192/89.22 |
| 2004/0262113 | A1 * | 12/2004 | Rudolf | F16D 13/52 |
| | | | | 192/70.27 |

FOREIGN PATENT DOCUMENTS

| | | | |
|---|---|---|---|
| JP | 1988-092829 | 6/1988 | |
| JP | 2002-181072 | 6/2002 | |
| JP | 2005-155734 | 6/2005 | |
| JP | 2007-225083 | 9/2007 | |
| JP | 2008-038940 | 2/2008 | |
| JP | 2008-144882 | 6/2008 | |
| JP | 2009-144890 | 7/2009 | |
| WO | WO-2008146650 A1 * | 12/2008 | F16D 13/56 |

* cited by examiner

CLUTCH DEVICE

TECHNICAL FIELD

The present invention relates to a clutch device and more specifically a clutch device that causes a transmitting condition of clutch (power transmitting condition) as a diaphragm spring pushes a pressure plate such that a friction disc is pressed against a rotating part (usually including a flywheel) (e.g., the friction disc is sandwiched between the pressure plate and the rotating part) and a disengaged condition of clutch (power non-transmitting condition) as a release device displaces tip ends of a plate springs provided in an inner circumference of a diaphragm spring such that bias force caused by the diaphragm spring to push the pressure plate is reduced or removed.

BACKGROUND ART

Conventionally, mainly in the automobile (e.g., two-wheel vehicle, four-wheel vehicle, and so on), the clutch device is very often used that causes the transmitting condition of clutch as the diaphragm spring pushes the pressure plate such that the friction disc (e.g., one or two or more friction discs) is pressed against the rotating part and the disengaged condition of clutch as an inner circumferential portion of the diaphragm spring (the tip ends of the plate springs) having been in the transmitting condition of clutch is displaced in one direction along the rotation axis of the clutch (the inner circumferential portion of the diaphragm spring is displaced by what is usually called as release fork) such that the bias force caused by the diaphragm spring to push the pressure plate is reduced or removed.

Here, the clutch device may be referred to as a "push type clutch" if the inner circumferential portion of the diaphragm spring (the tip ends of the plate springs) is displaced in a clutch inner direction (usually a direction toward a place where a flywheel exists) in shifting the condition of the clutch device from the transmitting condition of clutch to the disengaged condition of clutch while it may be referred to as a "pull type clutch" if displaced in a clutch outer direction (usually an opposite direction to that toward the place where the flywheel exists) in shifting the conditions of the clutch device from the transmitting condition of clutch to the disengaged condition of clutch.

The applicant has filed a plurality of patent applications relating to such a clutch device. For example, there are a friction clutch device for preventing or reducing damage to an intermediate disk, and having high power transmission performance and a longer operating life (Patent Reference 1), a release device for pull type clutch for providing drawing and disassembly of a release bearing (Patent Reference 2), a clutch device for preventing abrupt connecting/disconnecting (Patent Reference 3), a pressure plate in which a part of the pressure plate contacting a clutch spring is deformed only slightly (Patent Reference 4), and a friction single disc clutch for attaining high transmission power (Patent Reference 5).

Generally speaking, with respect to the clutch device, when the release device is displaced relative to the flywheel, the clutch may be connected or disconnected with a small displacement. And it is possible, by adjusting the displacement, to make a half clutch condition in which, while both rotating part and friction disc are rotating, a rotating speed of the friction disc is less than a rotating speed of the rotating part and power of the rotating part is partially transmitted to the friction disc.

PRIOR ART REFERENCE

Patent Reference

[Patent Reference 1] Japanese unexamined patent application No. 2009-144890.
[Patent Reference 2] Japanese unexamined patent application No. 2008-144882.
[Patent Reference 3] Japanese unexamined patent application No. 2007-225083.
[Patent Reference 4] Japanese unexamined patent application No. 2005-155734.
[Patent Reference 5] Japanese unexamined patent application No. 2002-181072.

SUMMARY OF THE INVENTION

Problems to be Solved by The Invention

Generally speaking, with respect to the clutch device, it is difficult to keep the above-mentioned half clutch condition as the clutch is connected or disconnected with such a small displacement if the release device is displaced relative to the flywheel. Since it is difficult to keep the half clutch condition, a big shock may be caused when the power is connected or disconnected by the clutch device. If such a clutch device is employed in an automobile (e.g., two-wheel vehicle, four-wheel vehicle, and so on), ride comfort may be deteriorated when it is shifted from the disengaged condition of clutch to the transmitting condition of clutch in particular.

Now, in an embodiment of the present intention, a clutch device in which the half clutch condition may be easily kept is provided where a diaphragm spring pushes a pressure plate in the clutch device such that a friction disc is pressed against a rotating part.

Means for Solving the Problem

According to an embodiment of the present invention, a clutch device (hereinafter referred to as a "present device") includes: a rotating part to rotate around a rotation axis as a center; a friction disc to rotate together with the rotating part by being pressed against the rotating part; a diaphragm spring having a plurality of plate springs provided along a circumferential direction around the rotation axis, wherein the plate springs have end portions projecting toward the rotation axis and constitute free ends; a pressure plate to press the friction disc against the rotating part as the pressure plate is biased (pushed) by the diaphragm spring; release means to disconnect power from the rotating part to the friction disc by reducing bias force of the diaphragm spring to push the pressure plate such that the diaphragm spring is deformed by displacing the free end sides of the plate springs in one direction along the rotation axis; wherein: the clutch device is a clutch device to connect and disconnect the power from the rotating part to the friction disc; and while a deformation amount X of the plate spring in the disconnected (disengaged) condition of clutch relative to the plate spring in the transmitting condition of clutch and a deformation amount Y of the plate spring in the half clutch condition relative to the plate spring in the disconnected (disengaged) condition of clutch, a ratio Z thereof (=Y/X) of one part is larger than those of the rest part other than the one part of the plurality of plate springs. Here, the release means includes a release device.

As such a clutch device is configured in this way, it can become easier to keep the half clutch condition such that the shock can be reduced when the power is connected/disconnected such that the deterioration of the ride comfort can be reduced if such a clutch device is employed in the automobile.

FIG. 1 shows an end face of a clutch device of pull type clutch (here, with respect to a release bearing 471, not showing an end face thereof); FIGS. 2A to 2C show diagrams illustrating a spring inner contact portion 413 (FIG. 2A shows the spring inner contact portion 413 from the arrow A direction of FIG. 1; FIG. 2B shows a B-B cross section of FIG. 2A; FIG. 2C shows the spring inner contact portion 413 viewed from the opposite direction (as viewed from the flywheel 103 side)); FIG. 3 shows a diaphragm spring 117 (clutch spring) as viewed from the arrow A direction; FIG. 4 shows a diagram illustrating a relation of the diaphragm spring 117 viewed from the arrow A direction of FIG. 1 and the spring inner contact part 413; and FIG. 5 shows an enlarged diagram of a release device 401 to be described later (as viewed in a similar direction of FIG. 1). With reference to FIGS. 1 to 5, a pull type of clutch device 201 will be explained.

The clutch device 201 includes: a clutch cover 107; a flywheel 103 fixed to an output shaft (crankshaft) of an engine; a clutch disc 13; a pressure plate 215; and a diaphragm spring 117 (clutch spring). And the clutch disc 13 has a center hub 15 and friction discs 11d. Here, the friction discs 11d are constituted of three friction discs: a first fiction disc 11a; a second friction disc 11b; and a third friction disc 11c, but the number of the friction discs is not limited at all (For example, the number may be one, two, four, or more.). And a main shaft 301 is inserted and fixed into the cylindrical part 15a shaped in a hollow circular cylinder of a center hub (Relative rotations of the cylindrical part 15a and the main shaft are restricted.).

The clutch cover 107 constitutes a container formed in a cylindrical shape without any top or bottom cover (A bottom face (on the flywheel 103 side) is fully open and the top face has an opening 107h.) and is provided with a circular opening 107h having a center in a center axis of the cylindrical shape on the top face. A diaphragm spring 117 (clutch spring) of a disc shape is attached thereto with a circumference thereof aligned with a circular opening 107h (An outer edge 117c of the diaphragm spring 117 is attached to an inner circumference of the clutch cover 107.). Here, the diaphragm spring 117, as shown in FIG. 3, is formed in a circular disc with the outer edge 117c of a circle having a center Y (located on an axis 15r to be described later) and a radius R11, and inner edges 117b are formed along a circle having the center Y and a radius R13 (There should be R13<R11.). And the diaphragm spring 117 has a plurality of slits 121 (cleavages formed in a cove shape) extending from the inner edges 117b along the radial direction and being arranged equiangularly and openings 121c having a larger size than that of widths (a size thereof in a perpendicular direction to the radial direction) of the slits 121 are formed on outermost sides of the respective slits 121 (near the outer edge 117c). Here, each slit 121 has the same shape and the same size.

The diaphragm spring 117 has a plurality of plate springs 118 formed in a strip shape as the plurality of slits 121 are formed along radial directions from the inner edges 117b. The plurality of plate springs 118 are connected one after another on respective outer sides (near the outer edge 117c) and have free ends on respective inner edge 117b sides. Here, the diaphragm spring 117 has portions extending from the respective inner edges 117b to around the respective slit 121 end portions (portions on the outer edge 117c side of openings 121c) that constitute the plate springs 118 and a portion extending from the slit 121 end portion to the outer edge 117c constitutes a spring main body 119 (A boundary line between the plate springs 118 and the spring main body 119 is shown as a broken line J in FIG. 3. Here, the plate springs 118 and the spring main body 119 are formed integrally from one sheet of plate member. And the diaphragm spring 117 does not necessarily have an actual boundary line. In the figure, a portion that could be a boundary is merely shown. The same applies hereinafter.).

The spring main body 119 (an opposite face to the face shown in FIG. 3) is brought into contact with the pressure plate 215 such that the diaphragm spring 117 biases the pressure plate 215 in a direction toward the flywheel 103. And such bias force causes a first friction disc 11a, a first mid plate 12a, a second friction disc 11b, a second mid plate 12b, and a third friction disc 11c to be squeezed by and between the pressure plate 215 and the flywheel 103, thereby transmitting power from the flywheel 103 to the center hub 15. That is, this condition is a condition where the clutch is connected (a transmitting condition of clutch).

On the other hand, the inner edges 117b (the end portions of the plate springs 118) of the diaphragm spring 117 are attached to a release device 401 such that the release device 401 may be moved (relative to the flywheel 103) toward the opposite side from the flywheel 103 (in an arrow R direction of FIGS. 1 and 5) by moving a release fork 181 (For example, it can be moved by operating a clutch pedal not shown in the figure.). Thus, when the release device 401 is shifted toward the opposite side from the flywheel 103 (in the arrow R direction of FIGS. 1 and 5), the inner edges 117b (the end portions of the plate springs 118) of the diaphragm spring 117 are also shifted toward the opposite side from the flywheel 103 (in the arrow R direction of FIGS. 1 and 5) such that the bias force that causes the diaphragm spring 117 (Here, the diaphragm spring 117 is a spring of a plate shape and capable of deforming elastically.) to push the pressure plate 215 in the direction toward the flywheel 103 is reduced or removed, thereby reducing or removing the bias force that causes the pressure plate 215 to push the friction disc 11d (the first friction disc 11a) in the direction toward the flywheel 103. In this way, the first friction disc 11a, the first mid plate 12a, the second friction disc 11b, the second mid plate 12b, and the third friction disc 11c are not squeezed (pressed against each other) by and between the pressure plate 215 and the flywheel 103 such that the power from the flywheel 103 to the center hub 15 may not be transmitted. That is, this condition is a condition where the clutch is disconnected (the disengaged condition of clutch).

Here, the center hub 15 includes: the cylindrical part 15a shaped in a hollow circular cylinder and a disc part 15b formed in a radially extending manner from the outer circumferential face of the cylindrical part 15a along a face perpendicular to the axis 15r (The axis 15r coincides with the rotation axis. The axis 15r coincides with the axis of the center hub.). The cylindrical part 15a and the disc part 15b are integrally formed and made of special steel (for example, SCM420 and so on). Here, although not shown in the figure, concave grooves capable of fitting convex strips of a spline shaft formed on a partial surface from an outer peripheral surface of the main shaft of the transmission, which is inserted into the cylindrical part 15a such that the partial surface faces an inner surface of the cylindrical part 15a, are formed on the inner surface. And the disc part 15b has a circular disc shape with a predetermined radius from the axis 15r of the cylindrical part 15a and the outer peripheral surface of the disc part 15b is formed to become a spline shaft. The spline shaft is a shaft with teeth utilized for transmitting rotational force and the teeth are formed by convex strips formed along the direction of the axis (It coincides with the axis 15r of the cylindrical part 15a.) of the center hub 15. And the convex strips formed on the outer peripheral surface of the disc part 15b which constitute the spline shaft are adaptably disposed to fit the concave grooves formed on the inner circumferential surface of the friction discs 11d (first friction disc 11a, second friction disc 11b, and third friction disc 11c).

In this way, the frictions discs 11d (first friction disc 11a, second friction disc 11b, and third friction disc 11c) are attached to the center hub 15 in such a manner that the revolution (rotation) around the axis of the center hub 15 (It coincides with the axis 15r of the cylindrical part 15a.) is restricted. Here, it should be understood how the friction discs 11d are fixed to the center hub 15 as described here.

And the pressure plate 215, the first mid plate 12a, and the second mid plate 12b are all fixed so as to rotate together with the rotation of the flywheel (The pressure plate 215, the first mid plate 12a, and the second mid plate 12b are all attached in such a manner that the revolution (rotation) relative to the flywheel 103 is restricted.). With respect to a method of attaching the pressure plate 215, the first mid plate 12a, and the second mid plate 12b and so on, similar manners as used in an ordinary clutch device (multiple-plate clutch device) may apply. More specifically, on the peripheral surfaces of the pressure plate 215, the first mid plate 12a, and the second mid plate 12b, convex strips of the spline shaft are formed. The convex strips are formed along the direction of the axis of the center hub 15 (It coincides with the axis 15r of the cylindrical part 15a.). On the other hand, concave grooves which the convex strips fit are formed on the inner circumferential surface of the clutch cover 107 fixed to the flywheel 103.

As illustrated in FIGS. 1 and 5, the release device 401 includes: a pull connector 411 that engages and fixes the inner edges 117b (end portions of plate springs 118) of the diaphragm spring 117 in the direction of rotation axis of the clutch (It coincides with the axis of the center hub 15 (the axis 15r of the cylindrical part 15a).); a release bearing 471 that has an inner race 473 disposed on an inner circumference side of the pull connector 411; and a connection part 451 that connects the pull connector 411 and the release bearing 471 detachably and attachably.

The connection part 451 includes: a cylinder part 451a that intervenes between the inner circumferential surface of the pull connector 411 (a cylinder main body 411a to be described later) and an outer peripheral surface of the inner race 473; and a flange part 451b extending radially outwards from an end part of the cylinder part 451a on the transmission side (on the opposite side from the flywheel 103). A ring part 451c is provided as it is formed around a circumference of the cylinder part 451a. The ring part 451c has a convex strip formed around the inner circumference of the cylinder part 451a. The ring part 451c has a convex strip formed around the outer periphery of the cylinder part 451a. The convex strip circling around the inner circumference of the cylinder part 451a is to engage with the concave groove 473c formed around the outer periphery of the inner race 473. Further, the convex strip circling around the outer periphery of the cylinder part 451a is to engage with the concave groove 411d formed around the inner circumference of the pull connector 411 (the cylinder main body 411a to be described later). In this way, the connection part 451 connects the pull connector 411 (the cylinder main body 411a to be described later) and the release bearing 471 (the inner race 473) detachably and attachably.

The pull connector 411 includes: the cylinder main body 411a of a hollow shape; a spring inner contact part 413 to support the inner edges 117b (the end portions of plate springs 118) of the diaphragm spring 117 by contacting vicinities thereof from the flywheel 103 side; and a spring outer contact part 415 to support the inner edges 117b (the end portions of plate springs 118) of the diaphragm spring 117 by contacting vicinities thereof from the opposite side from the flywheel 103. And the spring inner contact part 413 is attached to the cylinder main body 411a. The spring inner contact part 413 is attached by an engaging ring 422. The spring outer contact part 415 is formed in a disc spring shape and arranged in an internal corner on the flywheel 103 side of a circumferential convex strip (It may be also referred to as a ridge part in a flange shape.) provided on the outer peripheral surface in a middle height of the cylinder main part 411a so as to be locked and not to move in the direction of the arrow R. And it contacts the inner edges 117b (the end portions of the plate springs 118) and vicinities thereof of the diaphragm spring 117 from the opposite side from the flywheel 103. In this way, the inner edges 117b (the end portions of the plate springs 118) of the above-mentioned diaphragm spring 117 are contacted by the spring inner contact part 413 from the flywheel 103 side and by the spring outer contact part 415 from the opposite side from the flywheel 103, respectively, so as to be sandwiched and supported.

Therefore, the pull connector 411 can be shifted toward the opposite side from the flywheel 103 (in the direction of the arrow R in FIGS. 1 and 5) via the release bearing 471 and the connection part 451 by applying downward force on the right hand end side of the release fork 181 so as to operate. And the pull connector 411 can be shifted toward the flywheel 103 side (in the opposite direction to the arrow R direction in FIGS. 1 and 5) by bias force (spring back force) of the diaphragm spring by reducing the downward force applied to the right had end side of the release fork 181.

The spring inner contact part 413 includes, as shown in FIGS. 2A to 2C, the outer peripheral surface 413c and the inner circumferential surface 413b. The outer peripheral surface 413c has a shape curving along a side face of a right circular cylinder having a radius R41. The inner circumferential surface 413b has a shape curving along a side face of a right circular cylinder having a radius R43. Here, the right circular cylinder with the radius R41 and the right circular cylinder with the radius R43 have the common central axis. And R43<R41. A contact face 413s is formed to bridge the outer peripheral surface 413c and the inner circumferential surface 413b. The contact face 413s is formed to contact a plane perpendicular to the central axis of these right circular cylinders on its entire circumference. And the spring inner contact part 413 is fixed to the cylinder main body 411a such that the central axis of these right circular cylinders is included by a straight line that includes the rotation axis of the clutch (It coincides with the axis of the center hub 15 (the axis 15r of the cylindrical part 15a).).

In such a condition, all the inner edges 117b of free ends and vicinities thereof, which are main surfaces on the pressure plate 215 side, are in contact with the contact face 413s of the spring inner contact part 413 (refer to FIGS. 1 and 5). Therefore, as mentioned above, all the inner edges 117b (the end portions of the plate springs 118) and vicinities thereof of the plate springs 118 can be shifted toward the opposite side from the flywheel 103 (in the direction of the arrow R in FIGS. 1 and 5) by moving the release device 401 toward the opposite side from the flywheel 103 (in the direction of the arrow R in FIGS. 1 and 5). Then, thereby the spring main body 119 is deformed. And thus, the spring main body 119 reduces the bias force (pushing force) to bias (shift) the pressure plate 215 in the direction toward the flywheel 103 such that the clutch may be disconnected.

The present device includes: a rotating part; a friction disc, a diaphragm spring, a pressure plate, and release means.

The rotating part is to rotate around the rotation center by input power and usually includes the flywheel when the internal combustion engine is used as the power source.

The diaphragm spring is a member to press the friction disc against the rotating part by biasing the pressure plate. The diaphragm spring has a plurality of plate springs along the circumferential direction around the rotation axis as the center and these respective plate springs have their end potions projecting toward the rotation axis. The end portions of the plate springs are made free ends. Then, the diaphragm spring is deformed by displacing the end portions in one direction along the rotation axis. Here, the spring main body to which the base ends of the plate springs are attached is brought into contact with the pressure plate and biases the pressure plate. In this way, the spring main body is deformed. Thus, it is possible to reduce the bias force applied to the pressure plate via the diaphragm spring.

The pressure plate is to press the friction disc against the rotating part by being biased by the diaphragm spring.

As the diaphragm spring biases the pressure plate such that the friction disc is pressed against the rotating part so as to rotate together with the rotating part.

The release means deforms the diaphragm spring by displacing the side of the end portions (free ends) that the diaphragm spring has in one direction along the rotation axis. That is, the spring main body which the base ends of the plate springs are attached to and is brought into contact with the pressure plate so as to bias the pressure plate is deformed. By this, the bias force to be applied from the diaphragm spring to the pressure plate is reduced such that the power from the rotating part to the friction disc is disconnected (disengaged condition of clutch). And the force to displace in one direction the end portions of the plate springs the diaphragm spring has is reduced or removed (the end portions are displaced in the opposite direction to the one direction) such that the friction disc is pressed against the rotating part by the bias force applied from the diaphragm spring to the pressure plate and rotates together with the rotating part such that it become possible to make condition that the power is transmitted from the rotating part to the friction disc (transmitting condition of clutch). Here, if the "one direction along the rotation axis" is in an inner direction of the present device (usually in the direction toward the friction disc), the present device is a push type clutch device. And if it is an outer direction of the present device (usually in the opposite direction to the direction toward the friction disc), the present device is a pull type clutch device. The present device may be configured as either the push type clutch device or the pull type clutch device.

In this way, the end portions of the plate springs that the diaphragm spring has are displaced along the rotation axis by the release means such that the power from the rotating part to the friction disc may be freely connected and disconnected. And the position of the end portions may be in certain position between position in the transmitting condition of clutch and the disengaged condition of clutch. In such an intermediate condition between the transmitting condition of clutch and the disengaged condition of clutch, it is in the condition where the input power is partially tramsmitted from the rotating part to the friction disc. This means that both the rotating part and the friction disc are rotating, but it is referred to as a half clutch condition where the rotating speed of the friction disc is smaller than the rotating speed of the rotating part.

And with respect to the present device, a deformation amount of a plate spring in the disengaged condition of clutch is referred to as X relative to that in the transmitting condition of clutch and a deformation amount of the plate spring in the half clutch condition is referred to as Y relative to that in the transmitting condition of clutch. At this time, the ratio $Z$ ($=Y/X$) of one part of a plurality of plate springs the diaphragm spring has is larger than the ratio $Z$ ($=Y/X$) of the other part than the one part of the plurality of plate springs. As explained more in detail, suppose the diaphragm spring has n plate springs (here, n is an integer of 2 or more) and the ratio of plate spring $Z_i$ ($=Y_i/X_i$. Here, i is an integer of 1 to n.) may exist as many as n ratios such as $Z_1$ to $Z_n$ such that, for example, there may be a case where $Z_1$ is larger than $Z_2$ to $Z_n$ and another case where $Z_1$ to $Z_m$ (Here, m is an integer of 2 or more, but less than n.) are larger than $Z_{(m+1)}$ to $Z_n$.

In this way, the ratio $Z$ ($=Y/X$) of one part of the plurality of plate springs is larger than that of the other part than the one part such that, in the half clutch condition, the change in the bias force applied from the diaphragm spring to the pressure plate, the bias force corresponding to the displacement of the end potions of the plurality of plate springs, may be made small such that the half clutch condition may be kept for a wide range of the displacement of the end portions of the plate springs. Therefore, for example, in the case where a clutch pedal is pressed deep enough (lowest position) so as to make the disengaged condition of clutch and the clutch pedal is released (highest position) so as to make the transmitting condition of clutch, the position range of the clutch pedal to make the half clutch condition may be wider than the comparative example of clutch (the ratios Z are the same with respect to all the plurality of plate springs) such that it may be easier to keep the half clutch condition.

Here, if the ratio of the one part of the plurality of plate springs is small, the displacement range of the end portions to keep the half clutch condition may be wide, but it may be less likely to achieve easily the disengagement of clutch while, if the ratio is large, the displacement range of the end portions to keep the half clutch condition may be small, but it is more likely to achieve easily the disengagement of clutch such that the displacement range may be so adjusted as to satisfy both.

In the present device, the release means may include a spring contact displacement part to cause the displacement of the plate springs (displacement of the free end sides of the plate springs in the one direction along the rotation axis) by contacting the plate springs; and the spring contact displacement part includes a first contact face that contacts all the end portions or vicinities thereof of the one part, but does not contact any of the rest part; in the half clutch condition, the first contact face may contact the plate springs of the one part, but may not contact any of the plate springs of the rest part (Hereinafter, referred to as a "first contact face present device".).

In this way, the release means includes the spring contact displacement part (It causes the plate springs to make the displacement by contacting the plate springs.) and the spring contact displacement part includes the first contact face. The first contact face contacts all the end portions or vicinities thereof of the one part of the plurality of the plate springs, but does not contact any of the rest part of the plurality of the plate springs other than the one part while, in the half clutch condition, the first contact face contacts the one part of the plate springs among the plurality of plate springs, but does not contact the rest of plate springs among the plurality of plate springs. Therefore, in the half clutch condition, the first contact face of the spring contact displacement part contacts and deform only the one part of the plate springs such that it is surely possible to make the ratio Z (=Y/X) of the one part of the plurality of plate springs larger than the ratio Z (=Y/X) of the rest part other than the one part among the plurality of plate springs.

In the first contact face present device, the end portions of any of the one part among the plurality of plate springs extend closer to the rotation axis than any of the end portions of the rest part such that the first contact face may include outer edges along the circular periphery with the rotation axis as the center.

In this way, any of the end portions of the one part among the plurality of plate springs are arranged in positions within a predetermined radius from the rotation axis; any of the end portions of the rest part among the plurality of plate springs are arranged in positions farther than the predetermined radius from the rotation axis; and the first contact face includes outer edges along the circular periphery with the rotation axis as the center (circle with the predetermined radius) such that, if the first contact face is shifted in the one direction along the rotation axis, it is easy to achieve the condition where the first contact face contacts the one part of plate springs among the plurality of plate springs, but does not contact the rest of plate springs among the plurality of plate springs.

In the first contact face present device, the spring contact displacement part may include a second contact face that contacts all end portions of the rest part in the disengaged condition of clutch, but does not contact any of the one part; while, in the disengaged condition of clutch where the first contact face has the end portions of the one part shifted farther in the one direction than that in the half clutch condition, the first contact face contacts the one part of plate springs and the second contact face contacts the rest part of plate springs (hereinafter, referred to as a "second contact face present device").

In this way, the spring contact displacement part includes the second contact face in addition to the first contact face. The second contact face contacts all end portions of the rest part among the plurality of plate springs in the disengaged condition of clutch, but does not contact any of the one part among the plurality of plate springs. In the case of transition from the half clutch condition where the first contact face contacts the one part of plate springs, but does not contact any of the rest part of plate springs to the disengaged condition of clutch where the first contact face shifts the one part of end portions in the one direction, the first contact face contacts the one part of plate springs and the second contact face contacts the rest part of plate springs such that the end portions of the rest part of plate springs are shifted in the one direction. In this way, in the disengaged condition of clutch, all the endo portions of the one part and the rest parts of plate springs are shifted in the one direction such that the disengagement of clutch can be performed surely and easily such that the disengaged condition of clutch can be achieved well.

In the second contact present device, any of the end portions of the one part among the plurality of plate springs may extend closer to the rotation axis than any of the end portions of the rest part while the first contact face includes outer edges arranged along a circular periphery with the rotation axis as the center and the second contact face includes a circular shape formed between two concentric circles having the rotation axis as the center in which the outer edges of the first contact face are encompassed (Hereinafter, referred to as a "circular second contact face present device".).

In this way, any of the end portions of the one part among the plurality of plate springs are in positions within an area having a predetermined radius from the rotation axis; and any of the end portions of the rest part among the plurality of plate springs are in positions farther than the predetermined radius from the rotation axis; while the first contact face includes outer edges along a circle having the rotation axis as the center (circle having the predetermined radius) such that, if the spring contact displacement part is shifted in the one direction along the rotation axis, the first contact face contacts the one part of plate springs among the plurality of plate springs, but does not contact the rest part of plate springs among the plurality of plate springs. And the second contact face has a circular shape located between two concentric circles having the rotation axis as the center, which encompasses the outer edges of the first contact face (The second contact face encompasses the first contact face when viewed from the one direction.) such that the first contact face contacts the one part of plate springs while the second contact face does not contact the one part of plate springs, but can contact the rest part of plate springs well.

In the second contact face present device, the first contact face may exist on the one direction side from the second contact face.

Thus, in the case where end portions of the one part among a plurality of plate springs and end potions of the rest part among the plurality of plate springs are located approximately in the same potion with respect to the one direction in a transmitting condition of clutch (usually, it is often so), the first contact face is located closer to the one direction side than the second contact face such that, in the disengaged condition of clutch where the first contact face displaces end portions of the one part in the one direction farther than in the case of the half clutch condition, the second contact face can be brought into contact with the rest part of plate springs well.

With respect to the present device, an arrangement unit, in which one part area where a predetermined number of plate springs of the one part are arranged and the rest part area where a predetermined number of plate springs of the rest part are mutually adjacent with each other, is placed more than once equiangularly along the circular periphery having the rotation axis as the center such that all the plurality of plate springs may be arranged and included (Hereinafter, referred to as an "arrangement unit present device".).

In this way, the arrangement unit, in which the predetermined number of plate springs of the one part and the predetermined number of plate springs of the rest part are mutually adjacent with each other is placed more than once equiangularly along the circular periphery having the rotation axis as the center. Since the plurality of plate springs are all included in the arrangement, in which the arrangement unit is placed more than one time equiangularly along the circular periphery having the rotation axis as the center (All the plate springs arranged along the circular periphery belong to the arrangement unit.), the one part and the rest part are arranged regularly along the circular periphery having the rotation axis as the center and; the total force of respective forces applied to the end portions or vicinities thereof of the plurality of plate springs by the release means is easily made to be what is approximately parallel to the rotation axis for the whole diaphragm spring such that; the balance around the rotation axis may be taken well.

In the arrangement unit present device, if the plate springs are projected orthogonally onto the plane perpendicular to the rotation axis, respective plate springs exist in the plane and are formed by a plurality of slits of a cove shape formed along a plurality of straight lines passing through the rotation axis and arranged equiangularly and, while the number of plate springs belong to the one part area is referred to as S1 and the number of plate springs belong to the rest part area is referred to as S2, a ratio RS (=S2/S1) of S2 over S1 may be in a range from 0.5 to 2.5.

If the ratio RS (=S2/S1) of the number S2 of plate springs occupying the rest part area over the number S1 of plate springs occupying the one part area is small, the displacement range of the end portions of the one part may be small in order to keep the half clutch condition, but it may become easier to disconnect (disengage) the clutch; while, if the ratio RS is large, the displacement range of the end portions of the one part is large in order to keep the half clutch condition, but it may become more difficult to disconnect (disengage) the clutch, thereby the ratio RS may be determined to satisfy both of these. The ratio RS is usually preferably at least 0.5, more preferably at least 1.5, and preferably not exceeding 2.5, more preferably not exceeding 1.8 (In particular, it may be good to be from 1.5 to 1.8.).

BRIEF DESCRIPTIONS OF THE DRAWINGS

DETAILED EXPLANATION TO IMPLEMENT THE INVENTION

In the following, embodiments of the present invention will be explained in reference to the drawings. However, these would not limit the scope of the present invention.

One Embodiment

Figure 1:
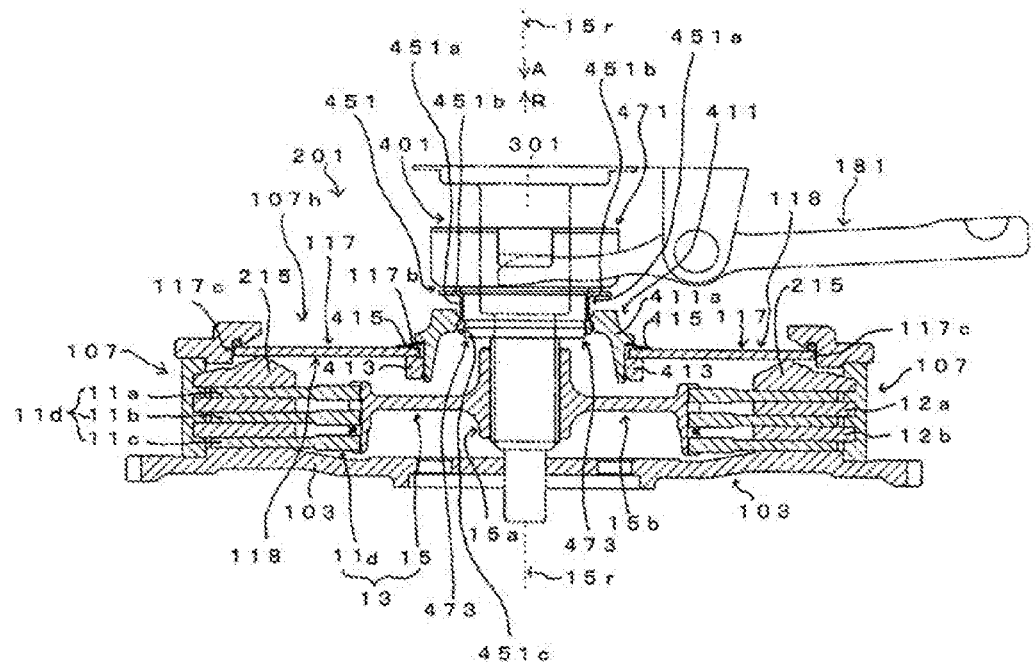
FIG. 1 shows an end elevation view of a clutch device of a pull type as a comparative example.
Figure 2A:
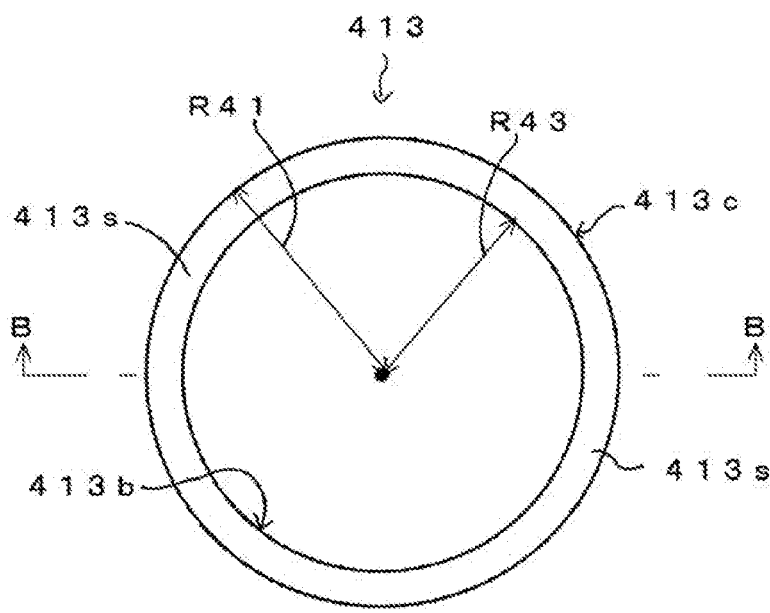
FIG. 2A shows a view of a spring inner contact part of the pull type of clutch device of FIG. 1 viewed from an arrow A.
Figure 2B:
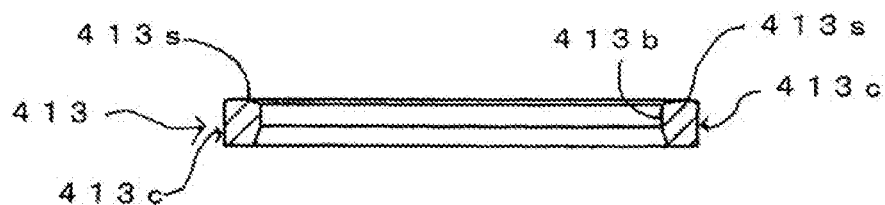
FIG. 2B shows a B-B cross section of the spring inner contact part of FIG. 2A.
Figure 2C:
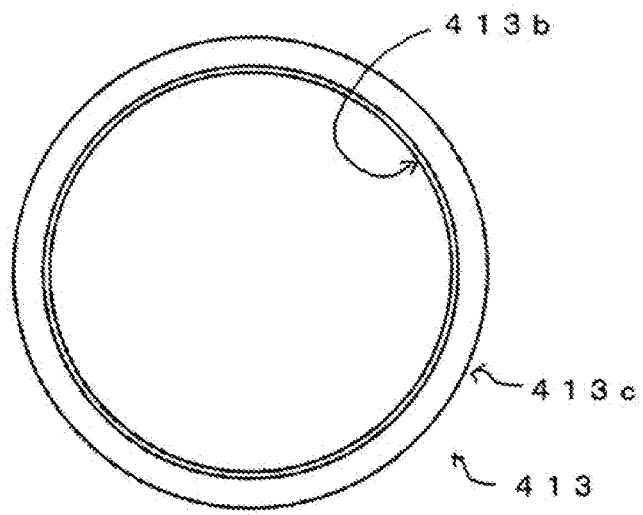
FIG. 2C shows a view of the spring inner contact part of the pull type of clutch device of FIG. 1, viewed from an opposite direction to the arrow A direction.
Figure 3:
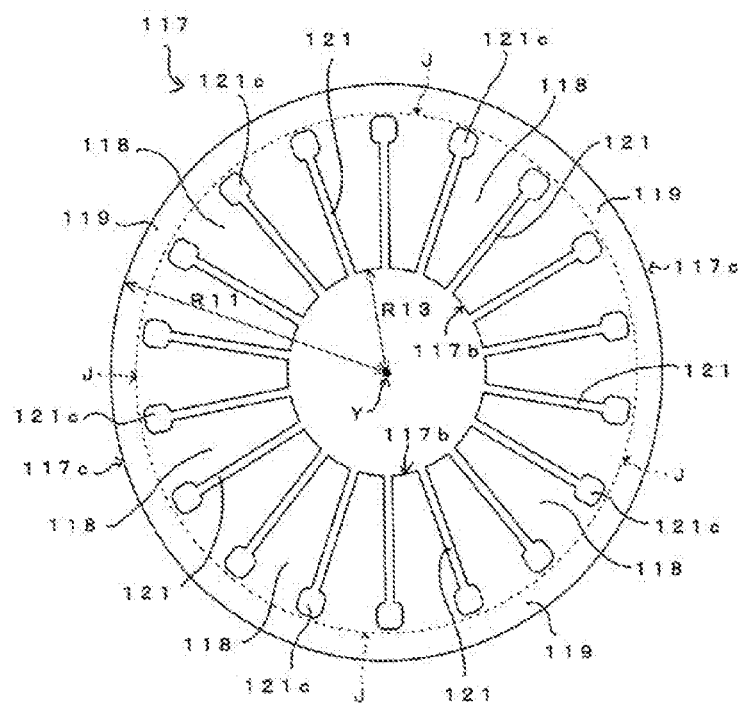
FIG. 3 is a diagram showing a diaphragm spring of a pull type of clutch device as a comparative example.
Figure 4:
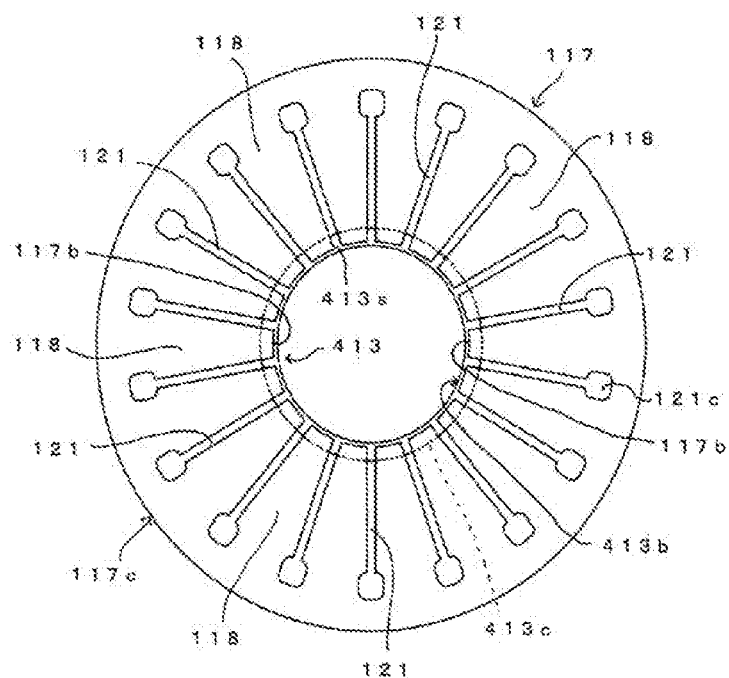
FIG. 4 is a diagram showing a relation of a spring inner contact part and a diaphragm spring of a pull type of clutch device as a comparative example.
Figure 5:
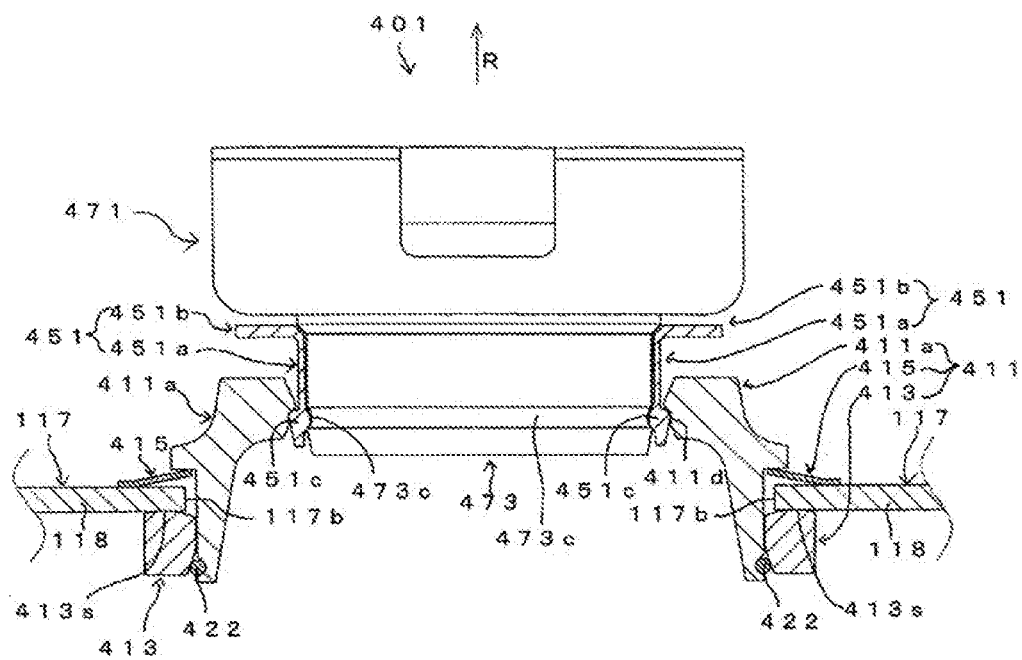
FIG. 5 shows an enlarged diagram showing a release device of a pull type of clutch device as a comparative example.
Figure 6:
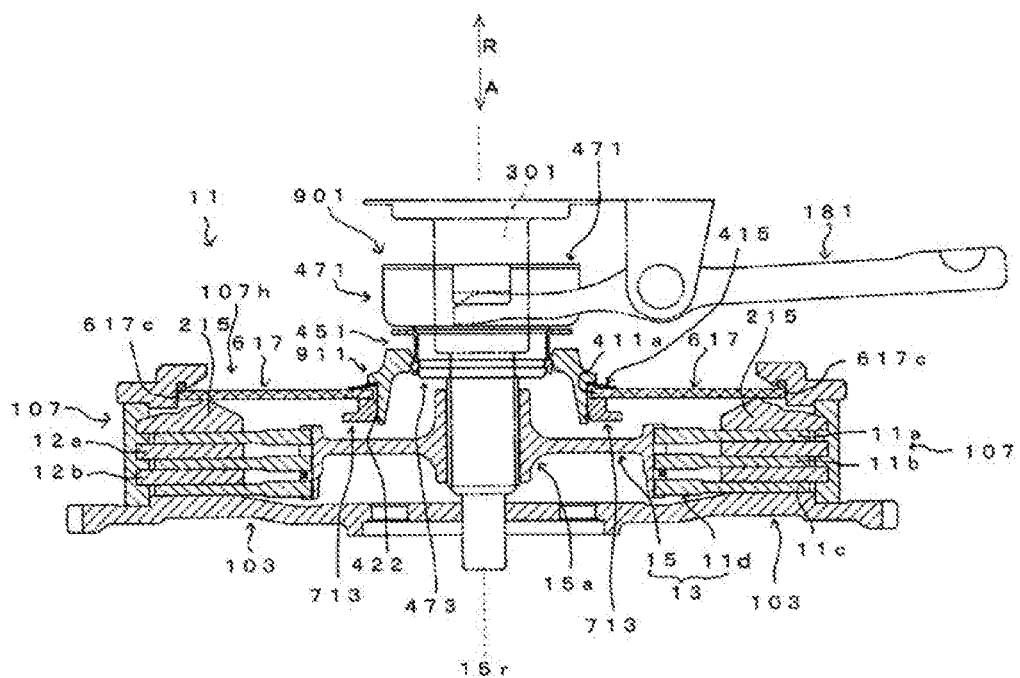
FIG. 6 shows an end elevation view of a pull type of clutch device (present device) according to one embodiment of the present invention.
Figure 7A:
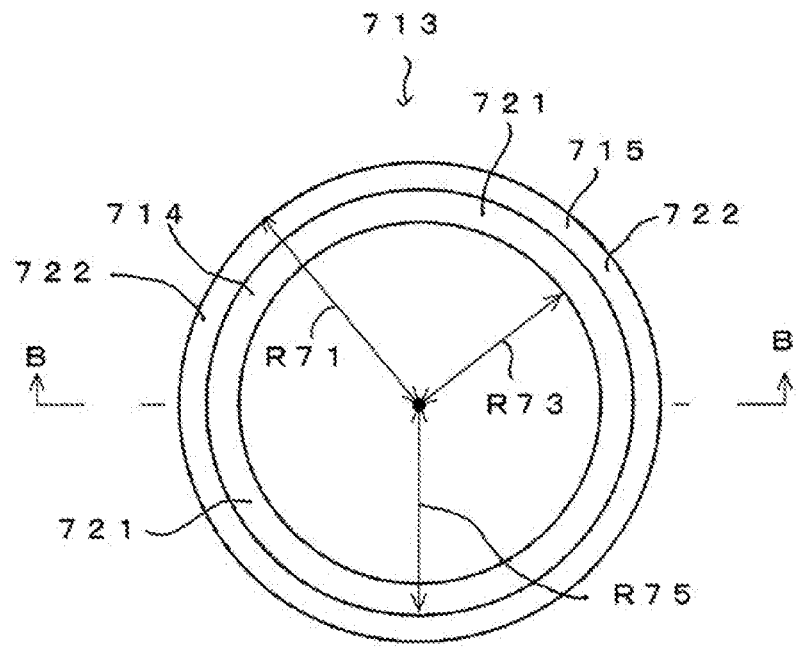
FIG. 7A shows a view of a spring inner contact part viewed from the arrow A direction of FIG. 6, which is used for a pull type of clutch device (present device) according to one embodiment.
Figure 7B:
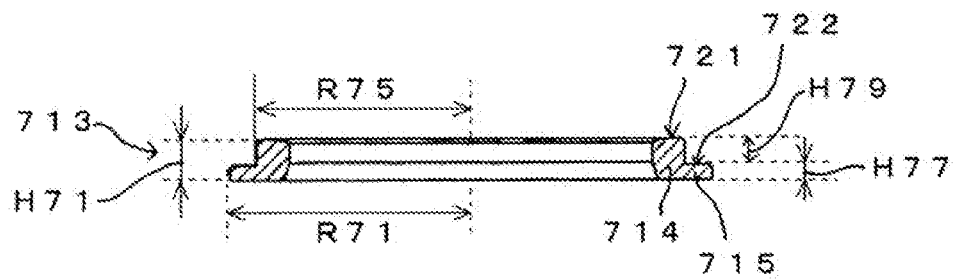
FIG. 7B shows a B-B cross section of the spring inner contact part of FIG. 7A.
Figure 7C:
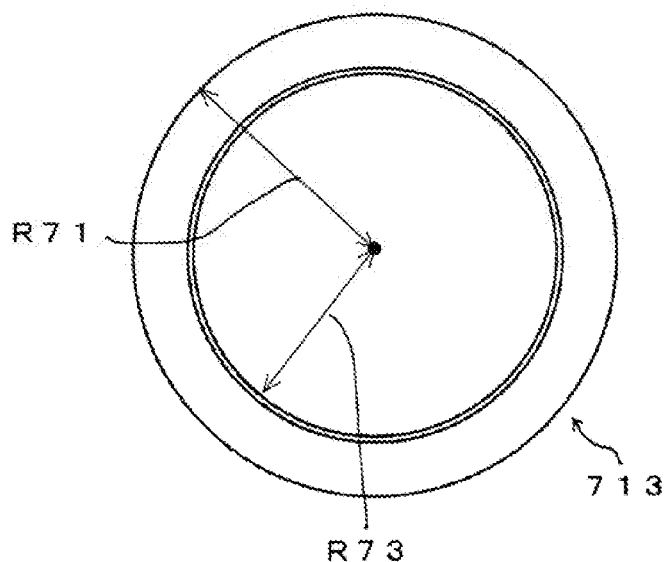
FIG. 7C shows a view of the spring inner contact part viewed from the opposite direction to the arrow direction of FIG. 6, which is used for a pull type of clutch device (present device) according to one embodiment.
Figure 8:
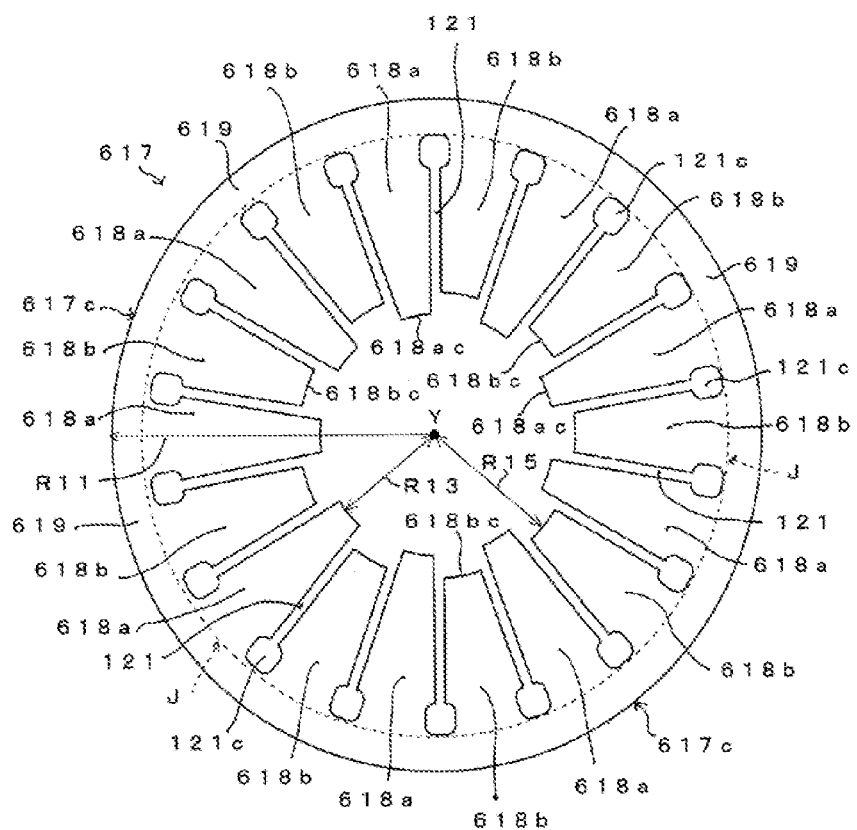
FIG. 8 is a diagram showing a diaphragm spring used for a pull type of clutch device (present device) according to one embodiment.
Figure 9:
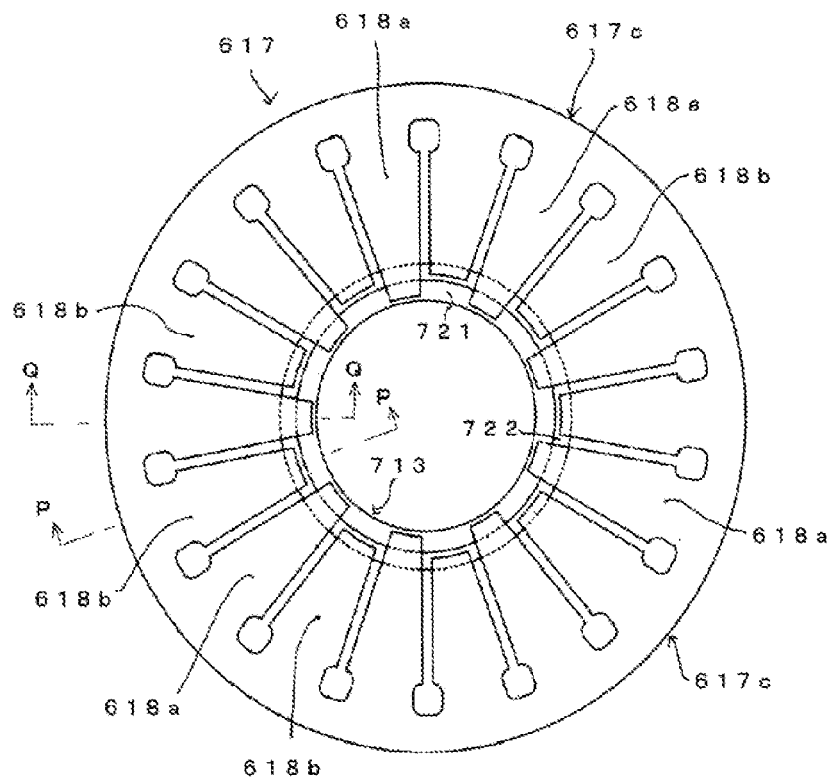
FIG. 9 is a diagram showing a relation of the spring inner contact part and the diaphragm spring in a pull type of clutch device (present device) according to one embodiment.
Figure 10:
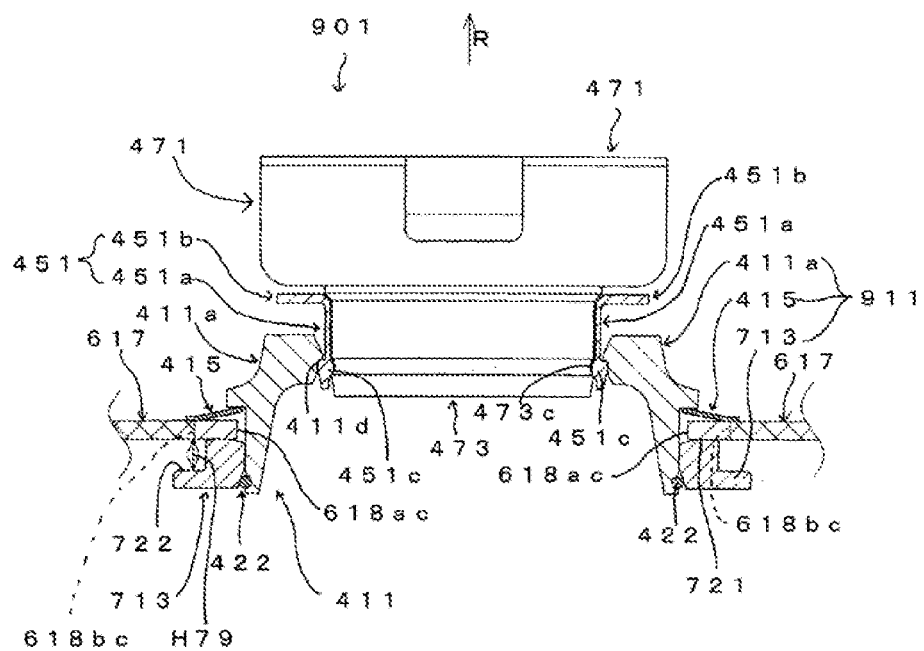
FIG. 10 shows an enlarged end elevation view of a release device of a pull type of clutch device (present device) according to one embodiment.

FIG. 6 shows an end elevation view of a pull type of clutch device 11 (present device) according to one embodiment of the present invention (Here, it does not show an end face of a release bearing 471.). FIGS. 7A to 7C show a spring inner contact part 713. FIG. 7A shows the spring inner contact part 713 viewed from an arrow A direction of FIG. 6. FIG. 7B shows a B-B cross section view of FIG. 7A. FIG. 7C shows a diagram showing the spring inner contact part 713 viewed from an opposite direction (viewed from the flywheel 103 side) to that of FIG. 7A. FIG. 8 shows a diagram illustrating the diaphragm spring 617 (clutch spring) viewed from the arrow A direction of FIG. 6. FIG. 9 is a diagram showing the relation of the spring inner contact part 713 and the diaphragm spring 617 viewed from the arrow A direction of FIG. 6. And FIG. 10 shows an enlarged view of a release device 901 to be described later in a large scale (viewed from a similar direction to that of FIG. 6). With reference to FIGS. 6 to 10, a pull type of clutch device 11 (present device) according to one embodiment of the present invention is explained. Here, with respect to the present device 11 according to one embodiment, duplicated explanations are omitted herein by assigning the same reference number (what is used in FIGS. 1 to 5) to each similar element as assigned and used for the pull type of clutch device 201 as the above-mentioned comparative example (Refer to the explanation of the pull type of clutch device 201 if necessary.).

The diaphragm spring 617 (clutch spring) of a disc shape is attached along a circumference of an opening 107h on a top face of a clutch cover 107 (An outer edge 617c of the diaphragm spring 617 is attached to an inner circumference of a clutch cover 107.). Here, the diaphragm spring 617 has an outer edge 617c defined along a circular circumference having a radius R11 from a center Y (which exists on an axis 15r) and, in the same manner as the diaphragm spring 117 of FIG. 3, a plurality of slits 121 are formed equiangularly and extend along the radius direction from inner edges with respect to the diaphragm spring 617 such that a plurality of strip-shaped plate springs 618a, 618b are formed. Here, inner edges 618ac of the plate springs 618a are defined along a circular circumference having a radius R13 from the center Y and inner edges 618bc of the plate springs 618b are defined along a circular circumference having a radius R15 from the center Y (here, R13<R15<R11). The plate springs 618a and the plate springs 618b are, as shown in FIG. 8, arranged alternately and all the plate springs 618a have the same shape and the same size while all the plate springs 618b have the same shape and the same size. In this way, the diaphragm spring 617 has equiangularly a plurality of slits 121 from inner edges (which are configured with inner edges 618ac and inner edges 618bc) along respective radial directions such that a plurality of strip-shaped plate springs 618a, 618b are formed in the diaphragm spring 617. The plurality of plate springs 618a, 618b are connected at the respective outer sides (near the outer edge 617c) with each other (fixed end portion) while free ends are provided on sides of the inner edges 618ac, 618bc.

The diaphragm spring 617 includes the plate springs 618a and 618b configured with portions extending from the inner edges 618ac and 618bc to end portions of the slits 121 (portions of openings 121c on the outer edge 617c side), respectively; and a spring main body 619 configured with a portion extending from the end portions of the slits 121 to the outer edge 617c (A boundary line between the plate springs 618a, 618b and the spring main body 619 is depicted as a broken line J.).

The spring main body 619 contacts the pressure plate 215 such that in turn the diaphragm spring 617 biases the pressure plate 215 toward the flywheel 103 direction. And the bias force squeezes the first friction disc 11a, the first mid plate 12a, the second friction disc 11b, and the second mid plate 12b, and the third friction disc 11c between the pressure plate 215 and the flywheel 103 such that the power is transmitted from the flywheel 103 to the center hub 15. That is to say, this condition is a clutch connected condition (the transmitting condition of clutch).

The inner edges 618ac, 618bc of the diaphragm spring 617 are attached to the release device 901 such that the release device 901 can be shifted toward the opposite side (in the arrow R direction in FIG. 6) from the flywheel 103 (relative to the flywheel 103) by moving the release fork 181 (For example, the movement may be achieved by operating a clutch pedal not shown in figures.). In this way, if the release device 901 is shifted toward the opposite side (in the arrow R direction in FIG. 6), the inner edges 618ac, 618bc of the diaphragm spring 617 are also shifted toward the opposite side (in the arrow R direction), such that bias force to cause the diaphragm spring 617 to push the pressure plate 215 toward the flywheel 103 direction is reduced or removed as they are shifted, thereby causing the clutch to be disconnected (the disengaged condition of clutch) in the same manner with the pull type clutch device 201 as the comparative example, while, if the release device 901 is shifted toward the flywheel 103 side (in the opposite direction from the arrow R in FIG. 6) (If the shifting force to move the release device 901 toward the opposite side (in the arrow R diction in FIG. 6) from flywheel 103 is reduced or removed, the release device 901 is shifted toward the flywheel 103 side (the opposite direction to the arrow R in FIG. 6).), the clutch is caused to be in the connected condition (the transmitting condition of clutch).

And the release device 901 includes: a pull connector 911 to engage and fix the inner edges 618ac, 618bc (FIG. 10 shows positions of both inner edges 618ac and 618bc.) of the diaphragm spring 617 in the direction of the clutch rotation axis (which coincides with the axis of the center hub 15 (the axis 15r of the cylindrical part 15a)), as shown in FIGS. 6 and 10; a release bearing 471 having an inner race 473 disposed on an inner circumference side of the pull connector 911; and a connection part 451 to connect detachably and attachably the pull connector 911 to the release bearing 471.

The release device 901 differs from the release device 401 of the pull type of clutch device 201 as a comparative example with respect to the spring inner contact part 713 to be described later. With respect to the others, the release device 901 is the same as the release device 401 of the pull type of clutch device 201.

The pull connector 911 includes: a hollow cylinder main body 411a; a spring inner contact part 713 to contact and support vicinities of the inner edges 618ac, 618bc of the diaphragm spring 617 from the flywheel 103 side; and a spring outer contact part 415 to contact and support vicinities of the inner edges 618ac, 618bc of the diaphragm spring 617 from the opposite side from the flywheel 103, wherein the spring inner contact part 713 is fixed to the cylinder main body 411a (fixed thereto by an engaging ring 422). In a similar manner as the case of the above diaphragm spring 117, the inner edges 618ac (end portions of plate springs 618a) of the diaphragm spring 617 are contacted and squeezed and supported by the spring inner contact part 713 from the flywheel 103 side and the spring outer contact part 415 from the opposite side from the flywheel 103, respectively. The inner edges 618bc (end portions of plate springs 618b) may be contacted by the spring outer contact part 415 from the opposite side from the flywheel 103.

Therefore, the pull connector 911 may be moved toward the opposite side (relative to the flywheel 103) from the flywheel 103 (in the arrow R direction in FIGS. 6 and 10) via the release bearing 471 and the connection part 451 by operating the release fork 181, and may be moved (relative to the flywheel 103) toward the flywheel 103 side (in the opposite direction to the arrow R direction in FIGS. 6 and 10) by the bias force of the diaphragm spring 617 as the force applied to the release fork 108 is reduced.

The spring inner contact part 713 of the pull connector 911 includes: a main body part 714 in a shape where, from a first right circular cylinder having a radius R75 and a height H71, a second right circular cylinder having a radius R73 and a height H71 (Here, the axis of the first right circular cylinder coincides with the axis of the second right circular cylinder.) is hollowed out; and a flange part 715 formed to project outward from one (which is closer to the flywheel) of both end faces of the first right circular cylinder, as shown in FIGS. 7A to 7C. The flange part 715 is formed in a shape where, from a third right circular cylinder (One end face of the third right circular cylinder and the one of both end faces of the first right circular cylinder are in the same plane and the axis of the third right circular cylinder is included in the axis of the first right circular cylinder.), a fourth right circular cylinder having a radius R75 and a height H77 is hollowed out (H77<H71, R73<R75<R71). In this way, a first contact face 721 having an outer radius R75 and an inner radius R73 and a second contact face 722 having an outer radius R71 and an inner radius R75 are formed and both the first contact face 721 and the second contact face 722 are along a plane perpendicular to the rotation axis of clutch (which coincides with the axis of the center hub 15 (the axis 15r of the cylinder part 15a)) and the first contact face 721 and the second contact face 722 are separated by H79 (=H71−H77) in the rotation axis of the clutch. If it is expressed in another way, the spring inner contact part 713 has a general shape of ring and may also be said to have a silk hat shape with an open top face and the flange part 715 corresponding to a brim thereof. There is a step difference H79 in the rotation axis direction between the first contact face 721 of the top face and the second contact face 722 of the flange part 715. The step difference H79 reflects on shifts (or movements) of the spring inner contact part 713 corresponding to transitions to a state where the plate springs 618a and 618b contact the first and the second contact faces, respectively; a state where the plate spring 618b does not substantially contact the second contact face; and a state where the plate spring 618a contacts the first contact face by the bias force caused by the spring main body 619 from the opposite side, but it does not substantially contribute to deformation of the spring main body. That is, if the step difference H79 is larger, the shift (or movement) of the spring inner contact part 713 from the state where only the plate spring 618a contacts to the state where both the plate spring 618a and 618b contact is larger. By setting the step difference H79 as appropriate, relative deformation of the plate springs 618a and 618b can be adjusted.

Figure 11:
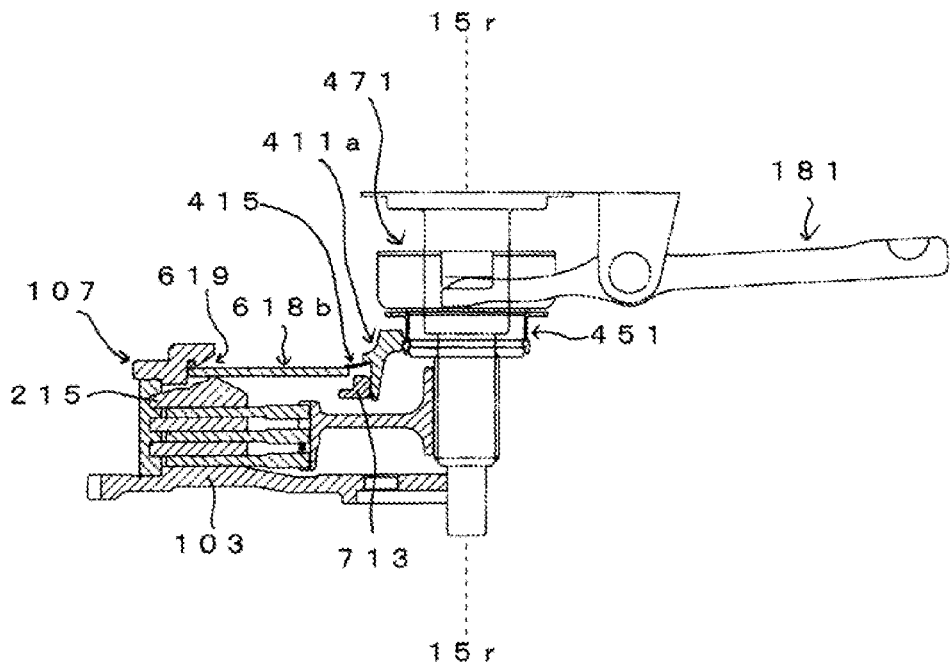
FIG. 11 shows an end elevation view (an end face including a plate spring 618b) of a pull type of clutch device (present device) according to one embodiment in a transmitting condition of clutch.
Figure 15:
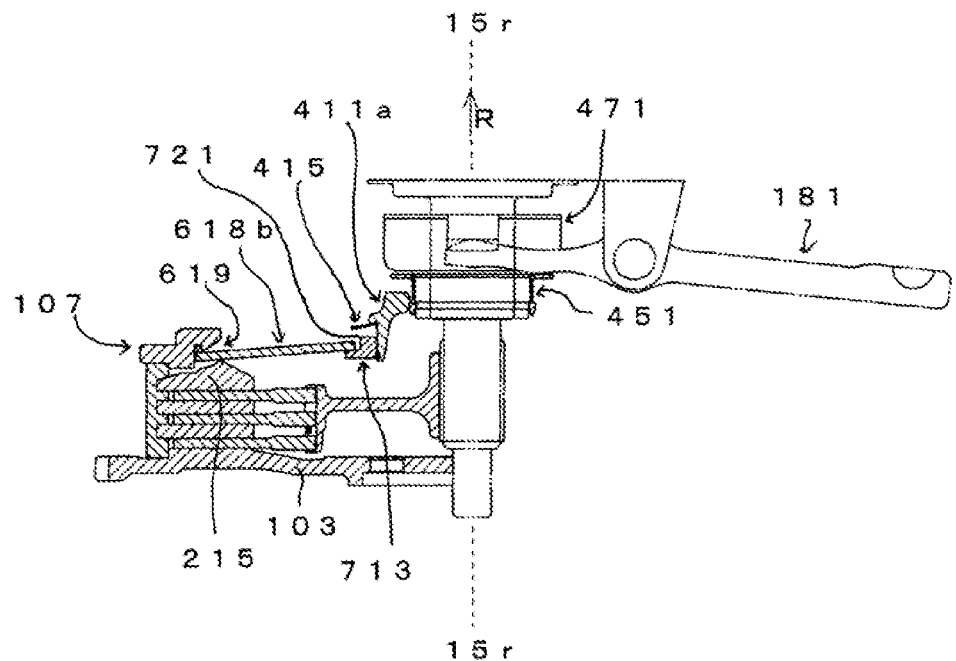
FIG. 15 shows an end elevation view (an end face including a plate spring 618b) of a pull type of clutch device (present device) according to one embodiment in a disengaged condition of clutch.

Generally speaking, the clutch device realizes conditions from the transmitting condition of clutch to the disengaged condition of clutch between a fully released position of a clutch pedal (A pedaling amount is 0.) and a fully depressed position thereof (The pedaling amount is maximum.) such that a half clutch condition is set in a middle thereof. Excluding the clutch pedal play, these pedaling amounts correspond to respective release strokes and the release stroke within the ordinary operation range of the clutch pedal is determined such that states from the transmitting condition of clutch to the disconnected condition of clutch (or vice versa) may be realized. More specifically, the amount of release stroke is considered to correspond to a displacement of the release fork from a state as shown in FIG. 11 to a state as shown in FIG. 15 such that it approximately corresponds to the displacement in the axis direction of the pull connector 411. And it corresponds to the length in the axis direction so as to be related to the height of the step difference H79 of the spring inner contact part 713. For example, if H79 is longer (or higher), it is considered that the displacement amount of the pull connector 411 from a state where the plate spring 618a contacts the first contact face to a state where the plate spring 618b contacts the second contact face would become longer (or larger). For example, if the displacement amount in the axis direction of the pull connector 411 corresponds, as it is, to the displacement amount of the release fork so as to correspond to the release stroke amount, the height (or length) of the step difference H79 may be at least 4% of the release stroke amount (length). On the other hand, the height (or length) of the step difference H79 may be not exceeding 70% thereof. Or, it may be a range from 5 to 70%. In an embodiment, it may be about 20%. Here, it is possible to set the half clutch condition to occur at 20% or more of the release stroke amount from the fully depressed position and to set the half clutch condition at 90% or less of the release stroke amount.

As shown in FIG. 9, if the diaphragm spring 617 and the spring inner contact part 713 included in the present device is viewed from the direction where the transmission exists among the bilateral sides in the extending direction of the rotation axis of the clutch (which coincides with the axis of the center hub 15 (the axis 15r of the cylindrical part 15a)), the center of the diaphragm spring 617 and the center of the spring inner contact part 713 exist on the rotation axis of the clutch (which coincides with the axis of the center hub 15 (the axis 15r of the cylindrical part 15a)). And the radius R15 (a radius of a circle along which the inner edges 618bc of the plate springs 618b are) is formed larger than R75 and formed smaller than R71 while the radius R13 (a radius of a circle along which the inner edges 618ac of the plate springs 618a are) is formed larger than R73 and formed smaller than R75. Therefore, if the spring inner contact part 713 is shifted toward the opposite side from the flywheel 103 (in the arrow R direction in FIGS. 6 and 10) along the rotation axis of the clutch, the free end sides of the plate springs 618a are shifted toward the opposite side from the flywheel 103 first by causing the first contact face 721 to contact vicinities of the inner edges 618ac of the plate springs 618a (At this time, the spring inner contact part 713 does not contact or does not contact strongly the plate springs 618b such that deformation of the plate springs 618b would hardly be caused by the spring inner contact part 713. Here, since the plate springs 618a, 618b are connected with each other by the spring main body 619, the plate springs 618b are also deformed slightly because of the effect of the deformation (displacement on the free end portions).). Further, if the spring inner contact part 713 is shifted toward the opposite side from the flywheel 103 along the rotation axis of the clutch, the free end sides of the plate springs 618b are shifted toward the opposite side from the flywheel 103 first by causing the second contact face 722 to contact or strongly contact vicinities of the inner edges 618bc of the plate springs 618b (Since not only the plate springs 618b but also the first contact face 721 contacts vicinities of the inner edges 618ac of the plate springs 618a such that the free end portions of the plate springs 618a are also further displaced toward the opposite direction from the flywheel 103.).

In this way, if the spring inner contact part 713 is displaced toward the opposite side from the flywheel 103 (in the arrow R direction in FIGS. 6 and 10) along the rotation axis of the clutch, as the condition changes from a small displacement condition toward a large displacement condition, the transition occurs from a state where none of plate springs 618a and the plate springs 618b are substantially deformed (All of the plate springs 618a and the plate springs 618b are approximately along one plane at this time.); then a state where the plate springs 618a are deformed while the plate springs 618b are hardly deformed; and to a state where both the plate springs 618a and the plate springs 618b are deformed. Accordingly, as described later, since the bias force to bias the pressure plate 215 in the direction toward the flywheel 103 by causing the spring main body 619 to contact the pressure plate 215 is reduced (The spring main body 619 is deformed by displacing the free end sides of the plate springs 618a, 618b toward the opposite side from the flywheel 103 such that the bias force is reduced because of the deformation of the spring main body 619.), the transition of the transmitting condition of clutch; the half clutch condition; and the disengaged condition of clutch can be achieved.

That is to say, the condition of the clutch is defined by relative rotation condition (or torque transmitting condition) of the flywheel 103 and the friction disc 11d and the condition of clutch is also changed by distance and pressing force (or contact condition) between the flywheel 103 and the mid plates 12a, 12b, and the respectively corresponding friction discs 11d such that it is possible to make the condition of the clutch correspond to the pedaling amount of the clutch pedal and/or the deformation amount of each plate spring 618a, 618b and the deformation amount of the spring main body 619 by adjusting them as appropriate. In general, in the transmitting condition of clutch, the pedaling amount of the clutch pedal is substantially none and the deformation amount of the plate springs 618a, 618b is substantially none such that the reduction effect of the bias force is substantially none and the flywheel 103 and the mid plates 12a, 12b contact the respectively corresponding friction discs 11d with enough pressing force (The distance is zero (0).). And, in the half clutch condition, there is a certain amount with respect to the pedaling amount of the clutch pedal; and there is a certain amount of deformation of the plate springs 618a, 618b such that there is a certain amount of the reduction effect of the bias force such that the pressing force that makes the flywheel 103 and the mid plates 12a, 12b contact the respectively corresponding friction discs 11d (The distance is zero (0).) is not necessarily enough such that it is considered that there occurs at least partially so-called slippage. And, in the disengaged condition of clutch, the pedaling amount of the clutch pedal is large enough and the deformation amount of the plate springs 618a, 618b is large enough such that the reduction effect of the bias force is enough such that it may be in the condition where the flywheel 103 and the mid plates 12a, 12b do not contact the respectively corresponding friction discs 11d (substantially in non-contact condition).

Thus, in the half clutch condition, the deformations of the plate springs 618a, 618b are non-uniform such that, with respect to the pedaling amount of the clutch pedal, the range to be in the half clutch condition is considered to be wider in comparison with the condition where the deformations of the plate springs are uniform. Therefore, it may be easier to keep the half clutch condition.

Here, the half clutch is an important element mainly in starting. After the clutch pedal is depressed to the maximum degree, the half clutch may be achieved by releasing the clutch pedal for a little amount. However, it is said to be difficult to adjust the depressing force and the releasing amount of the clutch pedal when releasing the clutch pedal in order to start the car without causing the engine stall and with the reduced starting shock. As mentioned above, in the half clutch condition, if the deformations of the plate springs 618a, 618b are performed in a stepwise fashion, the depressing force may be considered to change. The guide for the adjustment may be easily obtained.

Figure 12:
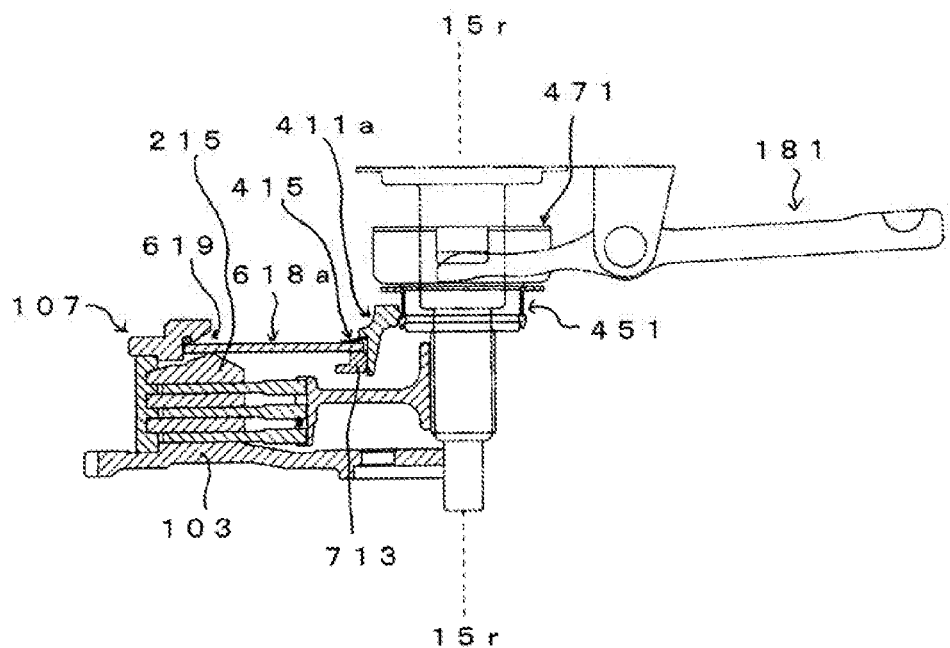
FIG. 12 shows an end elevation view (an end face including a plate spring 618b) of a pull type of clutch device (present device) according to one embodiment in the transmitting condition of clutch.

FIG. 11 shows an end elevation view illustrating the end face (It is the end face including the plate springs 618b. For example, it is the P-P end face in FIG. 9.) by the plane including the rotation axis of the clutch (the axis of the center hub 15 (the axis 15r of the cylindrical part 15a)), and FIG. 12 shows an end elevation view illustrating an end face (It is the end face including the plate springs 618a. For example, it is the Q-Q end face in FIG. 9.) by the plane including the rotation axis of the clutch (Both FIGS. 11 and 12 show only the left side from the axis 15r and depiction of the right side from the axis 15r is omitted.).

Both FIGS. 11 and 12 show the condition where the spring inner contact part 713 does not deform either the plate springs 618a or the plate springs 618b and the spring main body 619 of the diaphragm spring 617 contacts the pressure plated 215 such that the completely connected clutch condition (the transmitting condition of clutch) is achieved by biasing the pressure plate 215 in the direction toward the flywheel 103.

Figure 13:
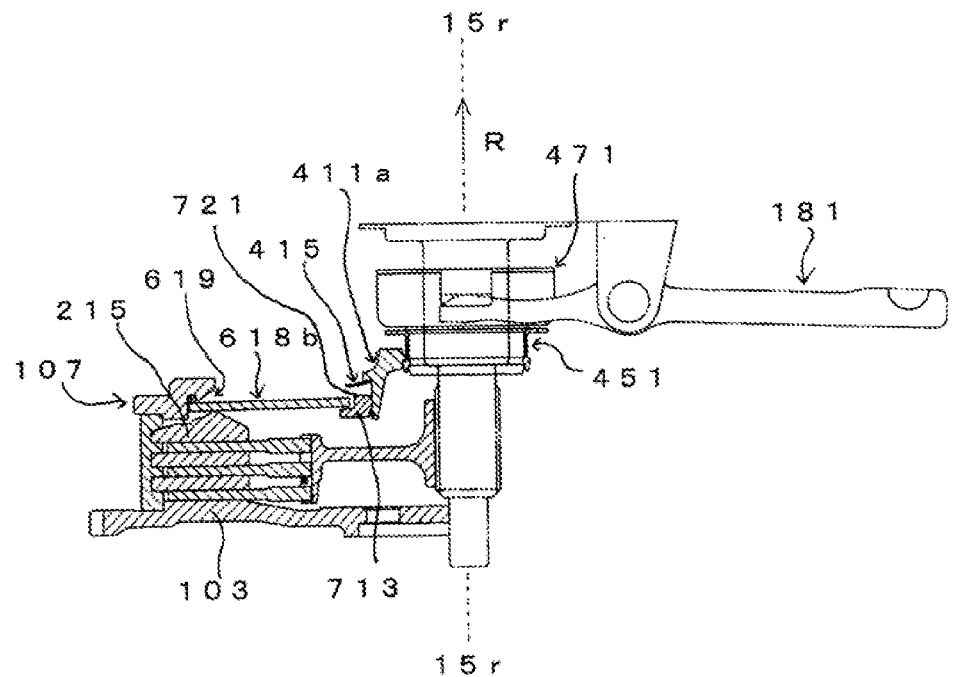
FIG. 13 shows an end elevation view (an end face including a plate spring 618b) of a pull type of clutch device (present device) according to one embodiment in a half clutch condition.
Figure 14:
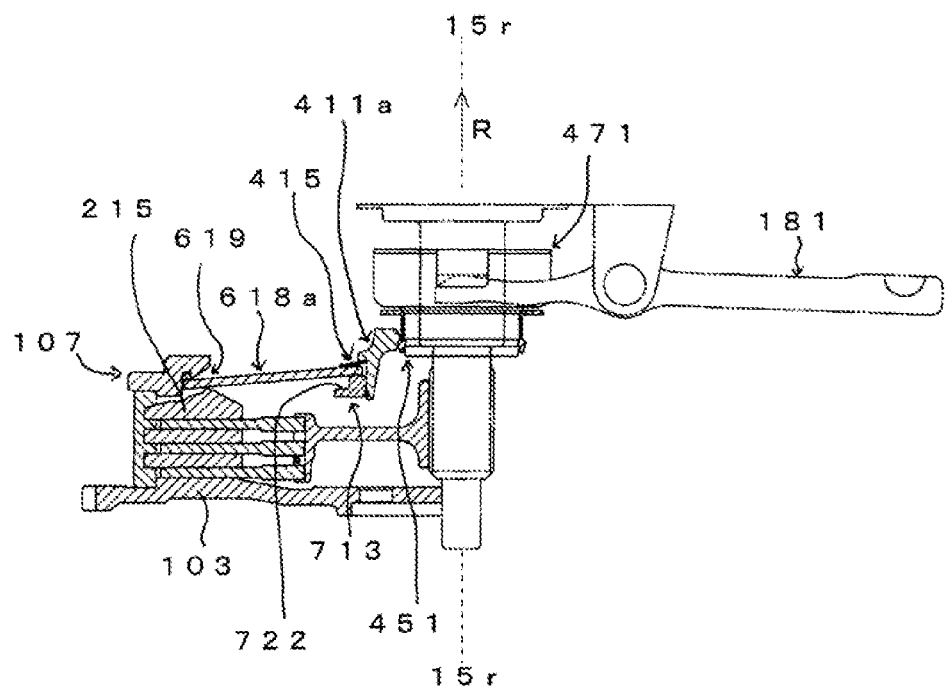
FIG. 14 shows an end elevation view (an end face including a plate spring 618b) of a pull type of clutch device (present device) according to one embodiment in the half clutch condition.

FIG. 13 shows an end elevation view illustrating a similar end face of FIG. 11 and FIG. 14 shows an end elevation view illustrating a similar end face of FIG. 12. Both FIGS. 13 and 14 show the condition from the transmitting condition of clutch of FIGS. 11 and 12 to that the spring inner contact part 713 is displaced toward the opposite side (in the arrow R direction in FIGS. 13 and 14) from the flywheel 103 along the rotation axis of the clutch.

In FIGS. 13 and 14, the free end sides of the plate springs 618a are displaced toward the opposite side from the flywheel 103 by causing the first contact face 721 to contact vicinities of the inner edges 618*ac* of the plated springs 618*a* (displacement from FIG. 12 to FIG. 14), but the plate springs 618*b* are not deformed while the second contact face 722 of the spring inner contact part 713 slightly contacts the plate springs 618*b* (The plate springs 618*b* are not displaced in FIG. 11 or 13.). Such displacements of the free end sides of the plate springs 618*a* as shown in FIG. 14 occur in all plate springs 618*a* such that the plate springs 618*a* deform the spring main body 619. By the deformation of the spring main body 619, the bias force to cause the portion of the spring main body 619 near the base end of the plate springs 618*a* to bias the pressure plate 215 in the direction toward the flywheel 103 is reduced. On the other hand, as shown in FIG. 13, no displacements of the free end portions of the plate springs 618*b* occur with respect to any of the plate springs 618*b* such that the plate springs 618*b* do not deform the spring main body 619 and the bias force to cause the portion of the spring main body 619 near the base end of the plate springs 618*b* to bias the pressure plate 215 in the direction toward the flywheel 103 is approximately the same as in the condition of FIGS. 11 and 12 (It hardly decreases in comparison to the transmitting condition of the clutch.). Thus, while the bias force made by the portion of the spring main body 619 near the plate springs 618*a* is greatly decreased, the bias force of the portion of the spring main body 619 near the plate springs 618*b* is almost maintained such that the half clutch condition is maintained in the condition of FIGS. 13 and 14.

Figure 16:
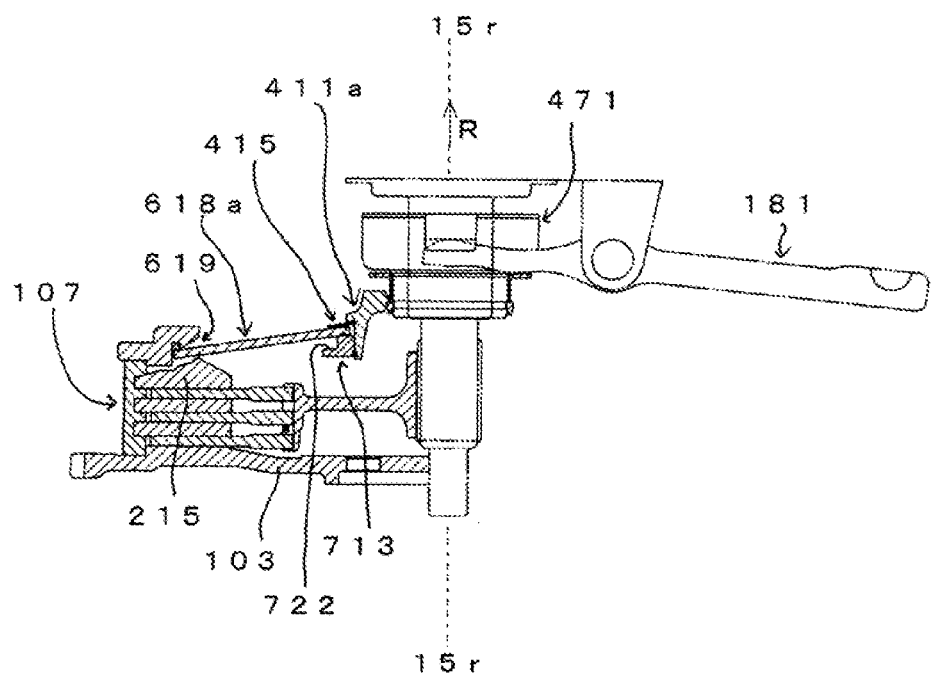
FIG. 16 shows an end elevation view (an end face including a plate spring 618b) of a pull type of clutch device (present device) according to one embodiment in the disengaged condition of clutch.

FIG. 15 shows an end elevation view illustrating an end face in a similar manner as FIG. 13 and FIG. 16 shows an end elevation view illustrating an end face in a similar manner as FIG. 14. Both FIGS. 15 and 16 show transition from the half clutch condition of FIGS. 13 and 14 to a state where the spring inner contact part 713 is displaced toward the opposite side from the flywheel 103 (in the arrow R direction in FIGS. 15 and 16) along the rotation axis of the clutch.

In FIGS. 15 and 16, the first contact face 721 of the spring inner contact part 713 causes the free end sides of the plate springs 618*a* to be displaced toward the opposite side from the flywheel 103 (displacement from FIG. 14 to FIG. 16) and the second contact face 722 of the spring inner contact part 713 also contacts vicinities of the inner edges 618*bc* of the plate springs 618*b* so as to have the free end portions of the plate springs 618*b* displaced toward the opposite side from the flywheel 103 (displacement from FIG. 13 to FIG. 15). Such further displacements of the free end sides of the plate springs 618*a* as shown in FIG. 16 occur with respect to all the plate springs 618*a*. This causes the plate springs 618*a* to deform the spring main body 619 further. This further deformation of the spring main body 619 causes the bias force to become almost 0, the bias force causing the portion of the spring main body 619 near the base end of the plate springs 618*a* to bias the pressure plate 215 in the direction toward the flywheel 103. And the displacement of the free end sides of the plate springs 618*b* occurs in all the plate springs 618*b* such that the plate springs 618*b* deform the spring main body 619. By the deformation of the spring main body 619, the bias force to cause the portion of the spring main body 619 near the base end of the plate springs 618*b* to bias the pressure plate 215 in the direction toward the flywheel 103 is greatly reduced. In this way, since the bias force caused by the portion of the spring main body 619 near the plate springs 618*a* is almost eliminated, the bias force caused by the portion of the spring main body 619 near the plate springs 618*b* is greatly reduced such that the condition of FIGS. 15 and 16 is the disengaged condition of clutch.

Here, in the disengaged condition of clutch and in the half clutch condition, as the force applied to the release fork 181 is reduced, the bias force of the plate springs 618*a*, 618*b* can have the spring inner contact part 713 moved toward the flywheel 103 side (in the opposite direction from the arrow R in the figure) so as to make the condition transit from the disengaged condition of clutch to the half clutch condition and transit from the half clutch condition to the transmitting condition of clutch. cl Another Embodiment A pull type of clutch device (present device) according to another embodiment of the present invention differs in the point where the diaphragm spring 617 (clutch spring) is replaced with a diaphragm spring 817 (clutch spring) from the present device 11 according to one embodiment. Others are the same as the present device 11. Therefore, only the diaphragm spring 817 will be explained with respect to the present device according to the other embodiment and the explanation of the others is omitted (The explanation of the present device 11 according to the one embodiment should be referred to if necessary.).

Figure 17:
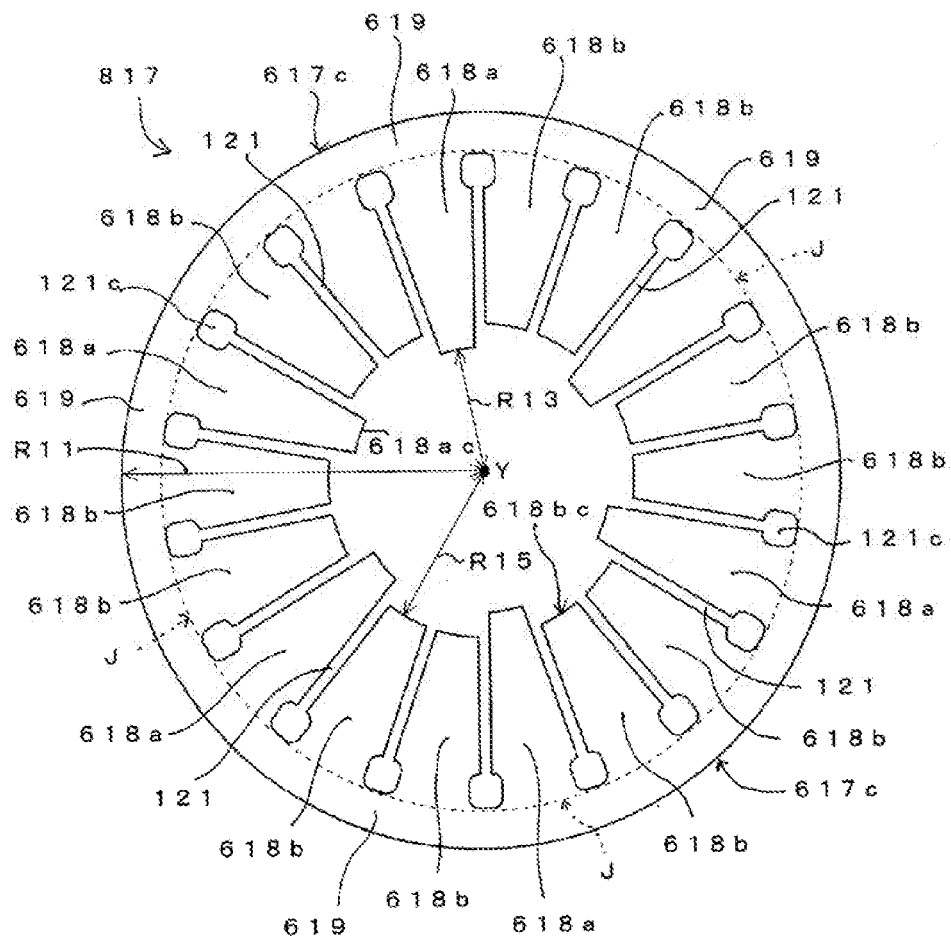
FIG. 17 is a diagram showing a diaphragm spring used for a pull type of clutch device (present device) according to another embodiment.

In the diaphragm spring 817, as shown in FIG. 17, an outer edge 617*c* is formed along a circular circumference having a radius R11 from a center Y and, in a similar manner as the diaphragm spring 617, the diaphragm spring 817 has a plurality of strip-shaped plate springs 618*a*, 618*b* formed by forming equiangularly a plurality of slits 121 extending from inner edges along the radial direction. Here, the inner edges 618*ac* of the plate springs 618*a* are formed along a circular circumference having a radius R13 from a center Y and the inner edges 618*bc* of the plate springs 618*b* are formed along a circular circumference having a radius R15 from the center Y (here, R13<R15<R11). With respect to the plate springs 618*a* and plate springs 618*b*, as shown in FIG. 17, one unit configured with two (a pair of) plate springs 618*b* and one plate spring 618*a* is repeated along the circumference direction of the diaphragm spring 817 such as two (a pair of) plate springs 618*b*, one plate spring 618*a*, two (a pair of) plate springs 618*b*, one plate spring 618*a*, two (a pair of) plate springs 618*b*, one plate spring 618*a*, and so on. Here, each of the plate springs 618*a* has the same shape and the same size and each of the plate springs 618*b* has the same shape and the same size (Here, the plate springs 618*a* have the same shape and the same size and the same kind of material as those of the present device 11 and the plate springs 618*b* have the same shape and the same size and the same kind of material as those of the present device 11.).

In this way, the diaphragm spring 817 has a plurality of slits 121 formed equiangularly and extending along the radial direction from the inner edges (which are configured with the inner edges 618*ac* and the inner edges 618*bc*) such that the diaphragm spring 817 has a plurality of strip-shaped plate springs 618*a*, 618*b* formed. The plurality of plate springs 618*a*, 618*b* are connected with each other on the outer side (near outer edges 617*c*) (fixed end) and have free ends on the inner edge 618*ac*, 618*bc* sides.

In the diaphragm spring 817, portions extending from inner edges 618*ac*, 618*bc* to end portions of the slits 121 (portions on the outer edge 617*c* side of the openings 121*c*) constitute the plate springs 618*a*, 618*b* and a portion from the end portions of the slits 121 to the outer edge 617*c* constitutes the spring main body 619 (In FIG. 17, a boundary line between the plate springs 618*a*, 618*b* and the spring main body 619 is depicted in a broken line.).

That is, the diaphragm spring 817 has a different arrangement of the plate springs 618a, 618b from that of the diaphragm spring 617, but it is fixed to and along the circumference of the opening 107h on the top face of the clutch cover 107 in the same way as the diaphragm spring 617 (The outer edge 617c of the diaphragm spring 817 is fixed to the inner circumference of the clutch cover 107.). And, in the same way as the diaphragm spring 617, the diaphragm spring 817 biases the pressure plate 215 in the direction toward the flywheel 103 as the spring main body 619 contacts the pressure plate 215.

Figure 18:
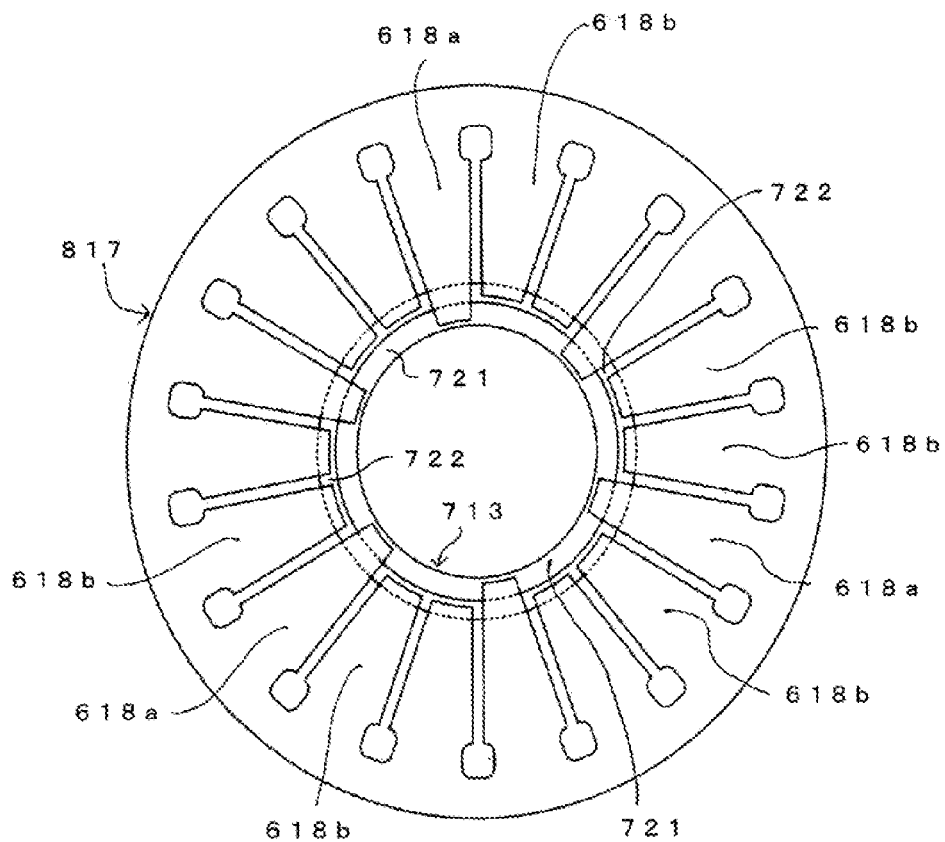
FIG. 18 is a diagram showing a relation of the spring inner contact part and the diaphragm spring in a pull type of clutch device (present device) according to another embodiment.

FIG. 18 shows a similar view to that of FIG. 9 with respect to the present device 11 according to one embodiment and illustrates the diaphragm spring 817 and the spring inner contact part 713 (which is the same as the spring inner contact part 713 included in the present device 11 according to the one embodiment) included in the present device according to another embodiment if viewed from the direction where the transmission exists among the bilateral sides in the extending direction of the rotation axis of the clutch (Which coincides with the axis of the center hub 15 (the axis 15r of the cylindrical part 15a).). In FIG. 18, the center of the diaphragm spring 817 and the center of the spring inner contact part 713 exist on the rotation axis (It coincides with the axis (the axis 15r of the cylindrical part 15a) of the center hub 15.) of the clutch. And while the radius R15 (a radius of a circular circumference along which the inner edges 618bc of the plate springs 618b are arranged) is larger than R75 and is smaller than R71, the radius R13 (a radius of a circular circumference along which the inner edges 618ac of the plate springs 618a are arranged) is larger than R73 and is smaller than R75. Therefore, if the spring inner contact part 713 is moved toward the opposite side (in the arrow R direction in FIGS. 6 and 10) from the flywheel 103 along the rotation axis of the clutch, the first contact face 721 contacts vicinities of the inner edges 618ac of the plate springs 618a first such that the free end sides of the plate springs 618a are displaced toward the opposite side from the flywheel 103 (Here, since the spring inner contact part 713 does not contact the free end sides of the plate springs 618b strongly, the displacement of the plate springs 618b by the spring inner contact part 713 is hardly generated. However, the plate springs 618a, 618b are mutually connected through the spring main body 619 such that the plate springs 618b are also deformed a little because of the effect of the deformations of the plate springs 618a.). Further, if the spring inner contact part 713 is displaced toward the opposite side from the flywheel 103 along the rotation axis of the clutch, the second contact face 722 contacts vicinities of the inner edges 618bc of the plate springs 618b such that the free end sides of the plate springs 618b are displaced toward the opposite side from the flywheel 103 (Here, not only the plate springs 618b, but also the first contact face 721 contact vicinities of the inner edges 618ac of the plate springs 618a such that the free end sides of the plate springs 618a are also displaced toward the opposite side from the flywheel 103.).

In this way, if the spring inner contact part 713 is displaced toward the opposite side from the flywheel 103 along the rotation axis of the clutch, in a similar way as explained with reference to FIGS. 11 to 16, as the displacement amount proceeds from small to large in the condition, transition occurs from the condition where none of the plate springs 618a and the plate springs 618b are deformed; then the condition where the plate springs 618a are deformed while the plate springs 618b are hardly deformed; and to the condition where both the plate springs 618a and the plate springs 618b are deformed. Accordingly, since the bias force to bias the pressure plate 215 in the direction toward the flywheel 103 by causing the spring main body 619 to contact the pressure plate 215 is reduced (The free end sides of the plate springs 618a, 618b are displaced toward the opposite side from the flywheel 103 such that the spring main body 619 is deformed and the bias force is reduced by the deformation of the spring main body 619.), transition may occur in series of the transmitting condition of the clutch, the half clutch condition, and the disengaged condition of the clutch.

And in the disengaged condition of clutch and the half clutch condition, if the force applied to the release fork 181 is reduced, the spring inner contact part 713 can be moved toward the flywheel 103 side (in the opposite direction to the arrow R direction in the figure) such that transition from the disengaged condition of clutch to the half clutch condition and transition from the half clutch condition to the transmitting condition of clutch may be achieved.

Figure 19A:
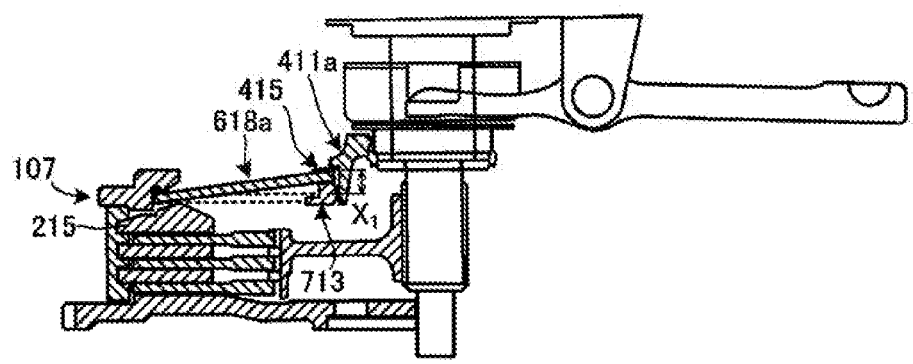
FIG. 19A shows an end elevation view illustrating a displacement amount $X_1$ of a plate spring 618a from the transmitting condition of clutch to the disengagement condition of clutch as the view is partially extracted from an end elevation view of the present device.
Figure 19B:
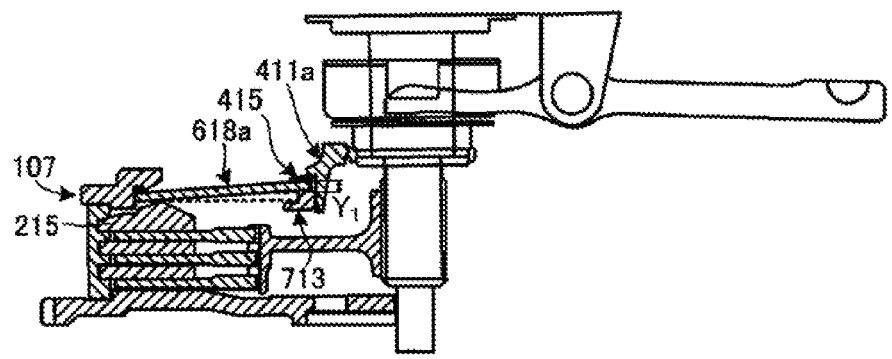
FIG. 19B shows an end elevation view illustrating a displacement amount $Y_1$ of the plate spring 618a from the transmitting condition of clutch to the half clutch condition as the view is partially extracted from the end elevation view of the present device.
Figure 20A:
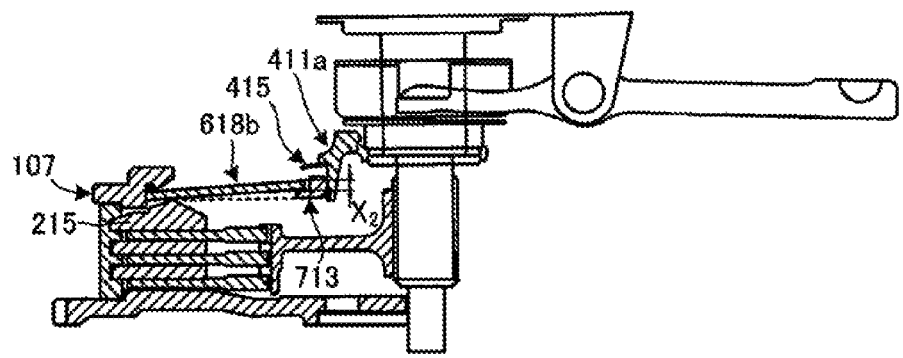
FIG. 20A shows an end elevation view illustrating a displacement amount $X_2$ of the plate spring 618a from the transmitting condition of clutch to the disengaged condition of clutch as the view is partially extracted from the end elevation view of the present device.
Figure 20B:
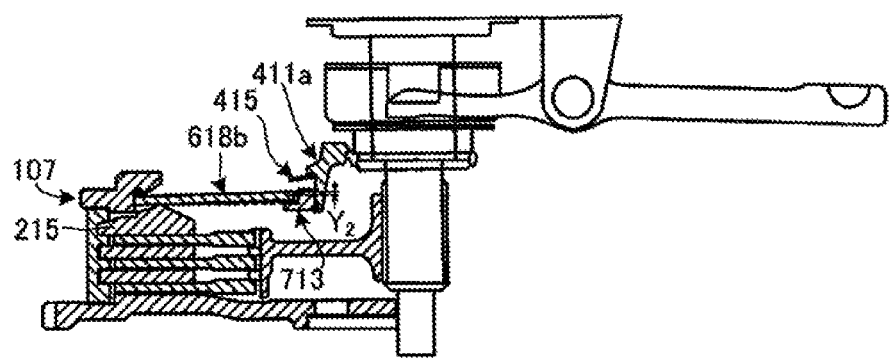
FIG. 20B shows an end elevation view illustrating a displacement amount $Y_2$ of the plate spring 618a from the transmitting condition of clutch to the half clutch condition as the view is partially extracted from the end elevation view of the present device.

As mentioned above, the present device 11 according to one embodiment and the present design according to another embodiment include: a rotating part to rotate around a rotation axis; a friction disc to rotate together with the rotating part by being pressed against the rotating part; a diaphragm spring 617, 817 having a plurality of plate springs 618a, 618b provided along a circumferential direction around the rotation axis wherein the plate springs 618a, 618b have end portions projecting toward the rotation axis and constitute free ends; a pressure plate 215 to press the friction disc against the rotating part as the pressure plate 215 is biased by the diaphragm spring 617, 817; and release means to disconnect power from the rotating part to the friction disc by reducing bias force of the diaphragm spring 617, 817 to push the pressure plate 215 such that the diaphragm spring 617, 817 is deformed by displacing the free end sides of the plate springs 618a, 618b in one direction along the rotation axis; wherein: the clutch device is a clutch device to connect and disconnect the power from the rotating part to the friction disc; and while a deformation amount X of the plate springs 618a, 618b in the disengaged (disconnected) condition of clutch relative to that in the transmitting condition of clutch and a deformation amount Y of the plate springs 618a, 618b in the half clutch condition relative to that in the disengaged (disconnected) condition of clutch, a ratio Z thereof (=Y/X) of one part 618a of the plurality of plate springs 618a, 618b is larger than that of the rest part 618b other than the one part 618a. Here, the above-mentioned rotation axis corresponds to the axis 15r in the figure. And the rotating part is configured by including a flywheel 103, the first mid plate 12a and the second mid plate 12b. And the friction disc is configured by including: the first friction disc 11a, the second friction disc 11b, and the third friction disc 11c. Here, the end portions projecting toward the above-mentioned rotation axis correspond to the inner edge 618ac, 618bc portions. And the end portions correspond to portions of the inner edges 618ac, 618bc. One direction along the rotation axis corresponds to a direction toward the opposite side from the flywheel 103 (the arrow R direction in the figure). The one direction along the rotation axis as mentioned above corresponds to an opposite side from the flywheel 103 (the arrow R direction in the figure). And free ends of the plate springs 618a, 618b correspond to the end portions (inner edges 618ac, 618bc). The release means may include the release device 901. The above-mentioned transmitting condition of clutch may include a condition as shown in FIG. 11 or 12. And the above-mentioned disengaged condition of clutch may include a condition as shown FIG. 15 or 16. Deformation amounts $X_1$, $X_2$ of the plate springs 618a, 618b correspond to differences of the plate springs 618a between in the condition of FIG. 12 and in the condition of FIG. 16 and differences of the plate springs 618b between in the condition of FIG. 121 and in the condition of FIG. 15, respectively. To compare with the condition of FIGS. 12 and 11 as the transmitting condition of clutch, deformation amounts $Y_1$ and $Y_2$ of the plate springs 618a and 618b in the condition of FIGS. 14 and 13 as in the half clutch condition are differences of the plate springs 618a between FIGS. 12 and 14 and differences of the plate springs 618b between FIGS. 11 and 13 (refer to FIGS. 19A and 20B), respectively. In the respective ratios $Z_1$ (=$Y_1/X_1$) and $Z_2$ (=$Y_2/X_2$), the ratio $Z_1$ (here, it is about 0.5) of one part 618b among the plurality of plate springs 618a, 618b is larger than the ratio $Z_2$ (here, almost 0) of the rest part 618b other than the one part.

In this way, if the ratio Z (=Y/X) of one part 618a among the plurality of plate springs 618a, 618b is made to be larger than that of the rest part 618b other than the one part among the plurality of plate springs, the position range of the clutch pedal (not shown in the figure) to make the half clutch (It drives the release fork 181 and full depression of the pedal (at the lowest position) causes the disengaged condition of clutch and releasing the pedal (at the highest position) causes the transmitting condition of clutch.) can be wider than that of the clutch as a comparative example (The ratio Z is the same for any of the plurality of plate springs.) such that it can be made easier to keep the half clutch condition. And a lower limit position of the pedal to provide the half clutch condition can be lower than that of the clutch of the comparative example such that, when the condition is shifted from the disengaged condition of clutch (at the lowest position) to the half clutch condition, the transition can be quickly and easily made.

In the present device 11 according to the one embodiment and the present device according to the other embodiment, the release means (release device 901) includes a spring contact displacement part (which is herein constituted of the spring inner contact part 713) to cause the plate springs 618a, 618b to make the displacement by contacting the plate springs 618a, 618b; the spring contact displacement part (the spring inner contact part 713) includes the first contact face 721 that contacts vicinities of all end portions (the inner edges 618ac portions) of the one part 618a, but does not contact any of the rest part 618b; and in the half clutch condition (FIGS. 13 and 14), the first contact face 721 contacts the plate springs of the one part 618a, but does not contact the plate springs of the rest part 618b.

In the present device 11 according to the one embodiment and the present device according to the other embodiment, all end portions (inner edges 618ac) of the one part 618a among the plurality of plate springs 618a, 618b are closer to the rotation axis (axis 15r) than any of the end portions (inner edges 618bc) of the rest part 618b; and the first contact face 721 includes an outer edge along a circle (circle having an outer radius R75) having the center on the rotation axis (axis 15r).

In the present device 11 according to the one embodiment and the present device according to the other embodiment, the spring contact displacement part (spring inner contact part 713) includes the second contact face 722 that contacts vicinities of all end portions (inner edge 618bc portions) of the rest part 618b in the disengaged condition of clutch (FIGS. 15 and 16), but does not contact any of the one part 618a; in the disengaged condition of the clutch (FIGS. 15 and 16) where the first contact face 721 further causes the end portions (inner edges 618ac) of the one part 618a to be displaced farther in the one direction (which is toward the opposite side (in the arrow R direction in the figure) from the flywheel 103) than those in the half clutch condition (FIGS. 13 and 14), the first contact face 721 contacts a plate spring of the one part 618a and the second contact face 722 contacts a plate spring of the rest part 618b.

In the present device 11 according to the one embodiment and the present device according to the other embodiment, all end portions (inner edges 618ac) of the one part 618a among the plurality of plate springs 618a, 618b are closer to the rotation axis (axis 15r) than any of end portions (inner edge 618b portions) of the rest part 618b; the first contact face 721 includes an outer edge along a circle (a circle having an outer radius R75) having the center of the rotation axis (axis 15r); the second contact part 722 includes an annular shape existing between two concentric circles (They are a circle having a radius R71 and a circle having a radius R75. Both of these are concentric.) having the center of the rotation axis (axis 15r), the annular shape surrounding the outer edge (circle having the outer radius R75) of the first contact face 721.

In the present device 11 according to the one embodiment and the present device according to the other embodiment, the first contact face 721 is arranged to be on the one direction (which herein is on the opposite side from the flywheel 103 side (in the arrow R direction in the figure)) farther than the second contact face 722 (by H79 (=H71−H77)).

In the present device 11 according to the one embodiment, an arrangement unit where one part area in which a predetermined number (Here, it is one (1).) of plate spring of the one part 618a is arranged and a rest area in which a predetermined number (Here, it is one (1).) of plate spring of the rest part 618b is arranged are adjacently arranged with each other (It is hereby configured with two plate springs: one plate spring 618a and one plate spring 618b.) is equiangularly arranged along a circular circumference having the center on the rotation axis (axis 15r) by multiple times (Here, it is nine (9) times.) such that all the plurality of plate springs 618a, 618b are included therein.

In the present device according to the other embodiment, an arrangement unit where one part area in which a predetermined number (Here, it is one (1).) of plate spring of the one part 618a is arranged and a rest area in which a predetermined number (Here, it is two (2).) of plate springs of the rest part 618b are arranged are adjacently arranged with each other (It is hereby configured with three plate springs: one plate spring 618a and two plate springs 618b.) is equiangularly arranged along a circular circumference having the center on the rotation axis (axis 15r) by multiple times (Here, it is six (6) times.) such that all the plurality of plate springs 618a, 618b are included therein.

In the present device 11 according to the one embodiment, when the plate springs 618a, 618b (plate springs 618a, 618b as shown in FIG. 8) are projected orthogonally on a plane perpendicular to the rotation axis (axis 15r), each of the plate springs 618a, 618b is divided by a plurality of cutout parts (configured with the slits 121) shaped in a cove-like shape formed along a plurality of straight lines for every equiangular interval (here, 20 degrees) passing through the rotation axis (axis 15r) and existing on the plane, and a ratio RS (=S2/S1) of the number S2 (Here, it is nine (9).) of plate springs 618b of the rest part area over the number S1 (Here, it is nine (9).) of plate springs 618a of the one part area is from 0.5 to 2.5 (Here, it is one (1).).

In the present device according to the other embodiment, when the plate springs 618a, 618b (plate springs 618a, 618b as shown in FIG. 17) are projected orthogonally on a plane perpendicular to the rotation axis (axis 15r), each of the plate springs 618a, 618b is divided by a plurality of cutout parts (configured with the slits 121) shaped in a cove-like shape formed along a plurality of straight lines for every equiangular interval (Here, it is 20 degrees.) passing through the rotation axis (axis 15r) and existing on the plane, and a ratio RS (=S2/S1) of the number S2 (Here, it is twelve (12).) of plate springs 618b of the rest part area over the number S1 (Here, it is six (6).) of plate springs 618a of the one part area is from 0.5 to 2.5 (Here, it is one (2).).

Yet Another Embodiment

Figure 21:
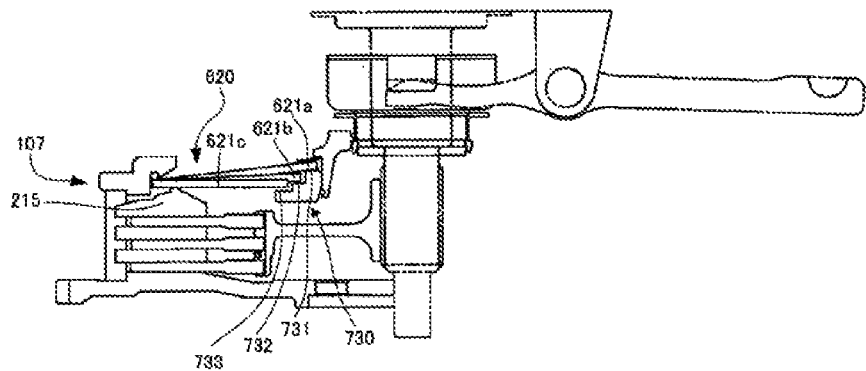
FIG. 21 shows an end elevation view of a pull type of clutch device in which a part is omitted therefrom according to yet another embodiment in the half clutch condition.

FIG. 21 shows an end elevation view illustrating an end face by a plane including a rotation axis of a clutch of a pull type of clutch device according to yet another embodiment, which corresponds to the pull type of clutch device (present device) 11 according to the one embodiment of the present invention. It is configured substantially with the same part structure as the above-mentioned one embodiment except differences in the plate springs and spring inner contact parts. Therefore, the above-mentioned contents should be referred to with respect to the configuration of these. In FIG. 21, a diaphragm spring 620 includes three kinds of plate springs 621a, 621b, and 621c in the descending order of the length and respective free end sides thereof could contact a first contact face 731, a second contact face 732, and a third contact face 733 of a spring inner contact part 730. In the same way as the above-mentioned spring inner contact part 713, the spring inner contact part 730 has annular shapes existing between concentric circles of three kinds of radii having the rotation axis as the center such that the concentric circles are formed to match three contact faces that three kinds of plate springs can contact, respectively. In FIG. 21, the half clutch condition is shown and the plate spring 621a contacts the first contact face 731 so as to be displaced upwardly in the figure. And the plate spring 621b contacts the second contact face 732 so as to be displaced slightly upwardly in the figure. Then, the plate spring 621c does not contact the third contact face 733. If it is compared with the one embodiment, the contact part has one more portion so as to have three portions in all. Heights of respective contact portions in the axis direction (corresponding to H79 of the above-mentioned one embodiment) are defined as the first contact face 731, the second contact face 732, and the third contact face 733 appearing in this order in the figure in the upward direction (corresponding to the R direction in FIG. 6). In this way, the contact part receives and contacts different kinds of plate springs in multiple steps such that smoother transition from the disengaged condition of clutch to the connected condition of clutch could be expected. These differences in the height (so-called step differences) could be set as appropriate. For example, according to some case where there are two kinds of contact portions as mentioned above, the height difference between the first contact face 731 and the third contact face 733 is determined and then the relative position (height) of the second contact face 732 may be determined such that more preferable clutch connection may be achieved by repeating further experiments and the like.

Still Another Embodiment

Figure 22:
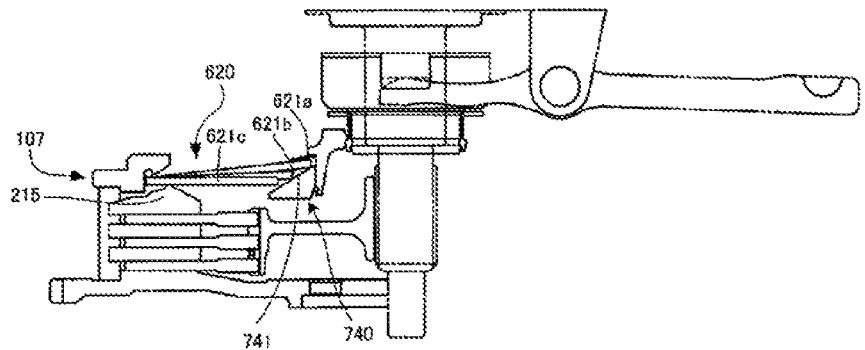
FIG. 22 shows an end elevation view of a pull type of clutch device in which a part is omitted therefrom according to still yet another embodiment in the half clutch condition.

FIG. 22 shows an end elevation view illustrating an end face by a plane including a rotation axis of a clutch of a pull type of clutch device according to still another embodiment, which corresponds to the pull type of clutch device (present device) 11 according to the one embodiment of the present invention. It is configured substantially with the same part structure as the above-mentioned one embodiment except differences in the plate springs and spring inner contact parts. Therefore, the above-mentioned contents should be referred to with respect to the configuration of these. And it differs from the yet another embodiment in FIG. 21 in that the contact face 741 of the spring inner contact face part 740 is made to be an inclined surface. In such a case where the inclined surface is employed, only if the diaphragm spring 620 has three kinds of plate springs 621a, 621b, and 621c in the order of length, respective free end sides thereof are to be contacted by a contact face that is the inclined surface of the inner contact part 740 at different heights in the order. Therefore, it is not necessary to make a step shape in particular such that more freedom in designing may be provided. It is possible to adjust the so-called step difference by adjusting the angle of the inclined surface. And only if the diaphragm spring 620 is changed, the manner of clutch connection may be changed.

In this way, it is possible to realize a mode in which the spring inner contact part 713 as described in the above-mentioned one embodiment further includes a third contact face outside or inside the second contact face. Plate springs having respectively-corresponding lengths can be included. The number of kinds of contact faces and respectively-corresponding plate springs can be four (4) or more and there are in particular no upper limits, but ten (10) or less may be industrially practical with respect to the clutch device for general automobile use. And it is possible to realize substantially stepless or continuous contacts of respective kinds of plate springs by continuous displacement (or movement) of the spring inner contact part as an outer portion of a cylindrical member on which the first, the second, (further, the third, . . . ) contact faces of the spring inner contact part 713 can be provided is made to be tapered (inclined) and then corresponding kinds of plate springs are prepared.

Still Yet Another Embodiment

So far, the explanation is made with respect to the pull type of clutch, but in the following, with respect to a case where an embodiment of the present invention is applied to a push type of clutch, explanation will be made with reference to FIGS. 23 to 27. As described so far, the clutch device according to an embodiment of the present invention includes a pull type of clutch and a push type of clutch. Since a basic structure thereof is the same as the pull type of clutch, the aforementioned should be referred to with respect to the corresponding parts.

Figure 23:
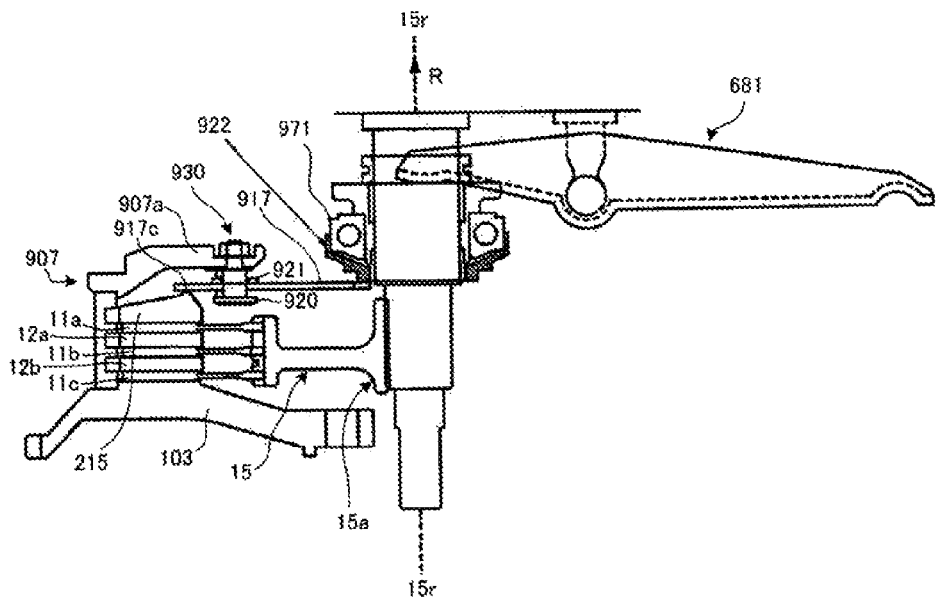
FIG. 23 shows an end elevation view of a push type of clutch device (present device) according to yet another embodiment in the transmitting condition of clutch.
Figure 24:
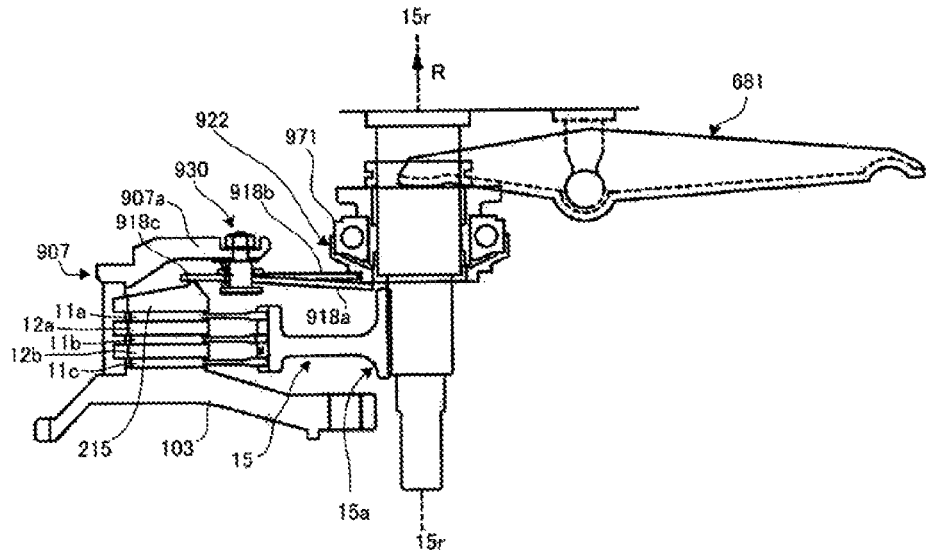
FIG. 24 shows an end elevation view of a push type of clutch device (present device) according to yet another embodiment in the half clutch condition.
Figure 25:
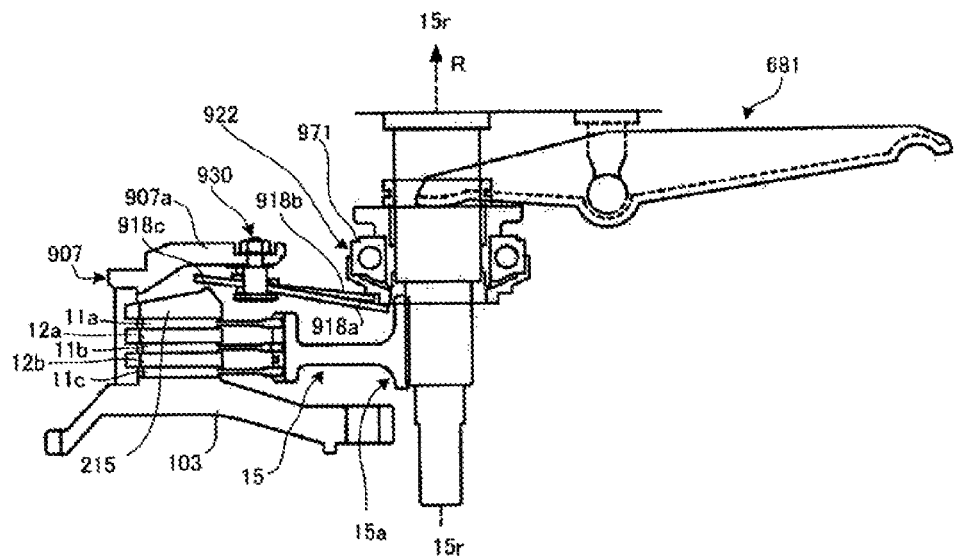
FIG. 25 shows an end elevation view of a push type of clutch device (present device) according to yet another embodiment in the disengaged condition of clutch.
Figure 26:
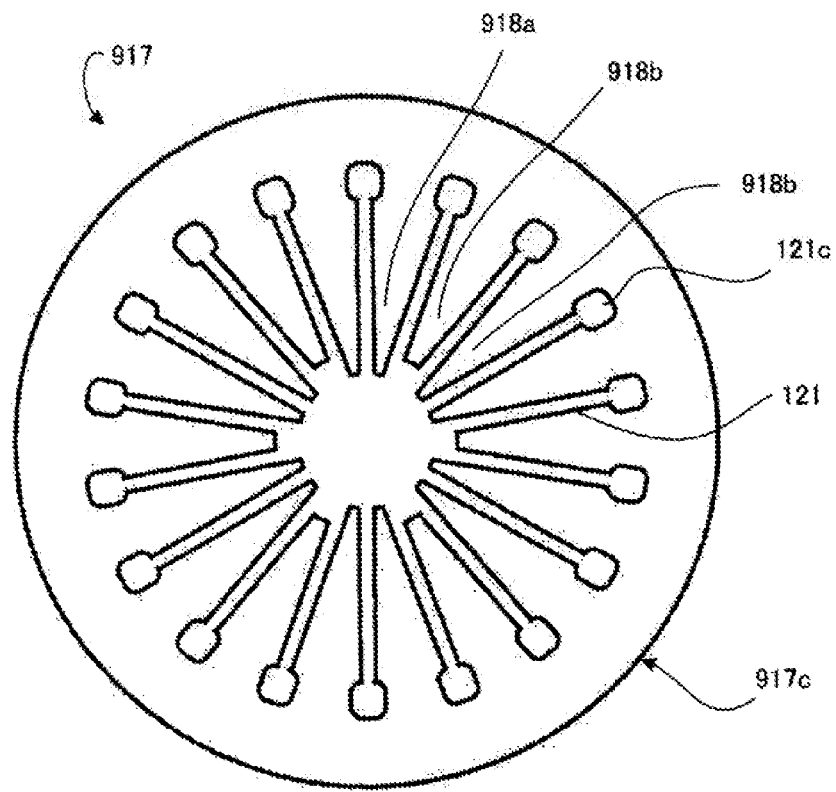
FIG. 26 is a diagram showing a diaphragm spring used for a push type of clutch device (present device) according to yet another embodiment.
Figure 27:
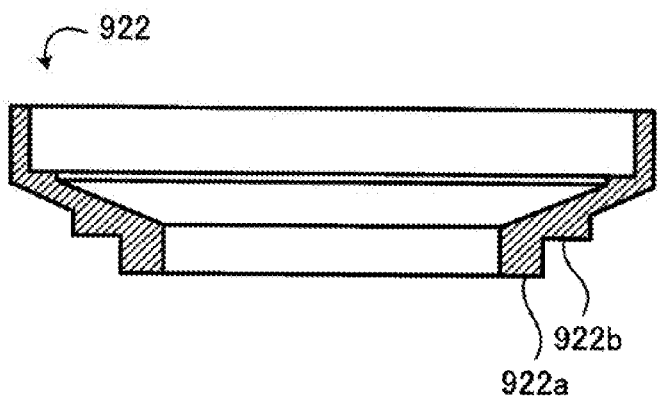
FIG. 27 shows a cross section view of a spring inner contact part of a push type of clutch device (present device) according to yet another embodiment.

FIGS. 23, 24, and 25 show end elevation views illustrating end faces by planes including the respective rotation axes of the push type of clutch device in the transmitting condition of clutch, in the half clutch condition, and in the disengaged condition of clutch, respectively, and FIG. 26 shows a diagram illustrating a diaphragm spring used for the push type of clutch device. And FIG. 27 shows a cross section view of the spring inner contact part.

FIG. 23 shows a state where a spring inner contact part 922 supported by a bearing 971 included in a release device included in the release means does not cause any of plate springs 918a or the plate springs 918b to be deformed wherein a contact portion 917c of a spring main body of a diaphragm spring 917 contacts a pressure plate 215 such that the pressure plate 215 is biased in the direction toward the flywheel 103 so as to realize a completely connected condition of clutch (the transmitting condition of clutch).

FIG. 24 shows a state where the spring inner contact part 922 is displaced from the transmitting condition of clutch of FIG. 23 in the direction toward the flywheel 103 side (the opposite direction to the arrow R direction in FIGS. 24 to 26).

In FIG. 24, a first contact face 922a of the spring inner contact part 922 contacts vicinities of inner edges of plate springs 918a such that free end sides of the plate springs 918a are displaced in a direction toward the flywheel 103 side (displacement from FIG. 23 to FIG. 24). And a second contact face 922b of the spring inner contact part 922 contacts only slightly the plate springs 918b, but the plate springs 918b are not deformed. Such displacement of free end sides of the plate springs 918a as shown in FIG. 24 is generated with respect to every plate spring 918a such that the plate springs 918a deform the spring main body 917. By the deformation of the spring main body 917, the contact portion 917c of the spring main body near the base end of the plate springs 918a is displaced in a direction toward the flywheel 103 while a support member 930 (including a fastener 920 and a spacer 921) fixed to a cover part 907a of a clutch cover 907 acts as a fulcrum such that the bias force to bias the pressure plate 215 in the direction toward the flywheel 103 is reduced. On the other hand, as shown in FIG. 24, no displacements of the free end sides of the plate springs 918 are made with respect to any of the plate springs 918b such that the plate springs 918b would not deform the spring main body 917 such that the bias force to cause the contact portion 917c of the spring main body near the base end of the plate springs 918b to bias the pressure plate 215 in the direction toward the flywheel 103 is almost in the same condition as the state of FIG. 23 (almost no reduction if compared with the transmitting condition of clutch). In this manner, the bias force may be greatly reduced by the contact portion 917c of the spring main body near the plate springs 918a, but the bias force of the contact potion 917c of the spring main body near the plate springs 918b is almost maintained. If it is in the condition of FIG. 24, the half clutch condition is maintained.

FIG. 25 shows an end elevation view illustrating a similar end face of FIG. 23 and a state where the spring inner contact part 922 is displaced in the direction toward the flywheel 103 side (the opposite direction to the arrow R direction in FIG. 25) along the rotation axis of the clutch from the half clutch condition of FIG. 24.

In FIG. 25, the first contact face 922a of the spring inner contact part 922 causes the free end sides of the plate springs 918a to be further displaced toward the flywheel 103 side (displacement from FIG. 24 to FIG. 25) and the second contact face 922b of the spring inner contact part 922 also contacts vicinities of the inner edges of the plate springs 918b so as to have the free end sides of the plate springs 918b displaced toward the flywheel 103 side (displacement from FIG. 24 to FIG. 25). Such further displacement of the free end sides of the plate springs 918a as shown in FIG. 25 is generated with respect to any one of the plate springs 918a. In this way, the plate springs 918a causes the spring main body to be further displaced. By this further displacement of the spring main body, the bias force to cause a portion of the spring main body near the base end of the plate springs 918a to bias the pressure plate 215 toward the direction of the flywheel 103 becomes almost zero (0). The, the displacements of the free end sides of the plate springs 918b as shown in FIG. 26 are generated with respect to all the plate springs 618b such that the plate springs 918b deform the spring main body. The deformation of the spring main body causes the bias force to be greatly reduced, the bias force causing the contact part 917c of the spring main body near the base end of the plate springs 618b to bias the pressure plate 215 in the direction toward the flywheel 103. In this way, since the bias force generated by the contact portion of the spring main body near the plate springs 618a is almost eliminated, and the bias force generated by the contact portion of the spring main body near the plate springs 618b is greatly reduced such that the condition of FIG. 25 is to be the disengaged condition of clutch.

Here, in the disengaged condition of clutch or in the half clutch condition, if the force applied to the release fork 681 is reduced, the spring inner contact part 922 can be moved toward the opposite side from the flywheel 103 (in the arrow R direction in the figure) by the bias force of the plate springs 918a, 918b such that transition from the disengaged condition of the clutch to the half clutch condition and transition from the half clutch condition to the transmitting condition of clutch can be achieved.

FIG. 26 shows a diagram illustrating the diaphragm spring 917 (clutch spring) of the push type of clutch device according to one embodiment, and it corresponds to the diaphragm spring 617 (clutch spring) of the pull type of clutch device. Since the basic structure is similar to those of FIGS. 8 and 17, the common explanation will be omitted. A unit of two long plate springs 918a to contact the first contact face 922a and one plate spring 918b to contact the second contact face 922b is repeated six (6) times. In general, it is preferable that the rotating member should be rotationally symmetrical. FIG. 27 shows a cross section view of the spring inner contact part 922 and the first contact face 922a and the second contact face 922b are depicted upside-down in a similar manner to the first contact face 721 and the second contact face 722 of the spring inner contact part 713 as shown in FIG. 7B.

As mentioned above, a clutch device according to an embodiment of the present invention, includes: a rotating part rotatable around a rotation axis; a friction disc to rotate together with the rotating part by being pressed against the rotating part; a pressure plate pressing the friction disc against the rotating part; a diaphragm spring to bias the pressure plate to make the friction disc pressed against the rotating part; and a release device to cut power from the rotating part to the friction disc by reducing the bias force as the displacement is implemented to deform the diaphragm spring against the bias force applied to the pressure plate. Then, the diaphragm spring is formed generally in a disc shape of thin plate (also referred to as a "disc spring") and has an annular spring main body made of continuous body in the outer circumferential portion near the outer edge and a plurality of plate springs are formed as a plurality of slits extends in the radial direction toward the center from vicinities of place shown by a broken line J in the figure wherein at least one plate spring extends longer than the other plate springs inwardly. An opening is provided at the center of the disc shape and the plurality of plate springs have free end potions on the inner sides, respectively. The release device includes the spring inner contact part to, from the rotating part side, contact the respective free end portions of the plurality of plate springs of the diaphragm spring so as to transmit displacement by input (for example, displacement by the release fork operation or connection/disengagement of the clutch) from the outside. The pull connector includes: the spring inner contact part; a spring outer contact part to contact and support, from the opposite side to the rotating part side, the respective free end portions; and a hollow cylinder main body including the spring inner contact part on the outer circumferential side, wherein the release device can also include the pull connector. In an example of the spring inner contact part herein, a cylindrical member including a flange part spreading outwardly on the bottom end part on the rotating part side is included. The cylindrical member includes a top end part on the opposite side from the bottom end part, which constitutes the first contact face. The flange part includes the second contact face on the opposite side of the bottom end part and a step difference contact part is configured with the first contact face and the second contact face. The step difference may be obtained by subtracting the thickness of the flange part from the height of the cylindrical member. In another example of the spring inner contact part, another contact face may be included such that two or more step differences are provided and a shape (inclined surface) by which the step difference may be continuous is provided, and a contact face may be provided such that the orientation of the step difference is reversed.

The clutch device according to an embodiment of the present invention includes a rotating part, a friction disc, a pressure plate, a diaphragm spring, and a spring inner contact part, wherein the diaphragm spring includes one or more contact faces and can contact a free end portion of the at least one plate spring and a free end portion on an inner edge side of the other plate spring, respectively.

As mentioned above, the clutch device according to an embodiment of the present invention includes what is modified from a structure and/or a formation of the diaphragm spring and the spring inner contact part. And by applying other parts of an ordinary clutch device together with the diaphragm spring and the spring inner contact part, a clutch device according to an embodiment of the present invention can be configured.

The first contact face may include an annular face including an end face of the cylindrical member on the top end part of the cylindrical member. The first contact face may include an annulus configured to be a disc having an opening at the center. The second contact face may include a circular face on the top end part side of the flange part. It is preferable that the at least one plate spring has a good rotational symmetry with respect to the rotation axis $15r$. For example, if it is configured with two plate springs, it is preferable that they are arranged in mutually opposing positions. If it is configured with three plate springs, it is preferable that they are arranged at positions mutually separated with $360/3$ degrees, respectively. If it is configured with n plate springs, it is preferable that they are arranged at positions mutually separated with $360/n$ degrees, respectively. No upper limit is particularly defined for n, it is industrially considered practical that n is not more than 100.

| [Explanation of Numerals] | |
|---|---|
| 11 clutch device | 11d friction disc |
| 11a first friction disc | 11b second friction disc |
| 11c third friction disc | 12a first mid plate |
| 12b second mid plate | 13 clutch disc |
| 15 center hub | 15a cylindrical part    15b disc part |
| 15r axis | 103 flywheel    107 clutch cover |
| 107h opening | 117 diaphragm spring |
| 117b inner edge | 117c outer edge    118 plate spring |
| 119 spring main body | 121 slit    121c opening |
| 181 release fork | 201 clutch device |
| 215 pressure plate | |
| 301 main shaft of transmission | |
| 401 release device | 411 pull connector |
| 411a cylinder main body | 411d concave groove |
| 413 spring inner contact part | 413b inner circumferential surface |
| 413c outer peripheral surface | 413s contact face |
| 415 spring outer contact part | 422 engaging ring |
| 451 connection part | 451a cylinder part    451b flange part |
| 451c ring part | 471 release bearing |
| 473 inner race | 473c concave groove |
| 617 diaphragm spring | 617c outer edge |
| 618a, 618b plate spring | 618ac, 618bc inner edge |
| 619 spring main body | 713 spring inner contact part |
| 714 main body part | 715 flange part    721 first contact face |
| 722 second contact face | 817 diaphragm spring |
| 901 release device | 911 pull connector |

What is claimed is:

1. A clutch device comprising:
a rotating part to rotate around a rotation axis as a center;
a friction disc to rotate along with the rotating part by being pressed against the rotating part;
a diaphragm spring having a plurality of plate springs arranged along a circumference having the rotation axis as a center, the plurality of plate springs comprising end portions projecting toward the rotation axis and being constituted of free end portions;
a pressure plate to be biased by the diaphragm spring so as to cause the friction disc to be pressed against the rotating part; and
a release device to cut power from the rotating part to the friction disc by reducing bias force applied from the diaphragm spring to the pressure plate as the diaphragm spring is deformed such that free ends of the plurality of plate springs are displaced in one direction along the rotation axis;
wherein:
the release device comprises a spring contact displacement part comprising at least a first contact face and a second contact face;
the plurality of plate springs comprise at least one plate spring to contact the first contact face and not the second contact face and at least one plate spring to contact the second contact face and not the first contact face; and first contact of the first contact face and corresponding the at least one plate spring and second contact of the second contact face and corresponding the at least one plate spring occur at different timings during transition from disengaged condition of clutch to transmitting condition of clutch by operation of the release device.

2. The clutch device according to claim 1 wherein:
the spring contact displacement part further comprises a third contact face; and
the plurality of plate springs further comprise at least one plate spring to contact the third contact face,
wherein, in a process of transiting from the disengaged condition of clutch to the transmitting condition of clutch by operation of the release device, the first contact and the second contact and the third contact of the third contact face and corresponding the at least one plate spring occur at different timings during transition from the disengaged condition of clutch to the transmitting condition of clutch by operation of the release device.

3. The clutch device according to claim 2 wherein:
the at least one plate spring to contact the first contact face comprises an end portion closer to the rotation axis than any of end portions of other plate springs; and
the first contact face is configured to contact the end portion or a vicinity of the at least one plate spring to contact the first contact face earlier than other contact faces in transition by displacement in the one direction along the rotation axis.

4. The clutch device according to claim 1 wherein the first contact face and the second contact face are provided on a surface inclined to the one direction.

5. The clutch device according to claim 1 wherein:
the first contact face comprises an outer edge along a circle having the rotation axis as a center; and
the second contact face comprises an annular shape existing between two concentric circles having the rotation axis as a center and surrounding the outer edge of the first contact face.

6. The clutch device according to claim 1 wherein the first contact face is provided on a displacement side in shifting from the disengaged condition of clutch to the transmitting condition of clutch along the one direction farther than the second contact face.

7. The clutch device according to claim 1 wherein the plurality of plate springs are provided rotationally symmetrical to the rotation axis as a center with respect to the diaphragm spring.

8. The clutch device according to claim 1 wherein:
the at least one plate spring to contact the first contact face and the at least one plate spring to contact the second contact face are adjacently arranged so as to form an arrangement unit; and
the plurality of plate springs comprises a configuration where a plurality of arrangement units are arranged equiangularly along a circumference having the rotation axis as a center.

9. The clutch device according to claim 1 wherein a ratio of a number of the at least one plate spring to contact the first contact face and a number of the at least one plate spring to contact the second contact face is from 0.5 to 2.5.

10. The clutch device according to claim 1 comprising a pull type clutch.

11. The clutch device according to claim 1 comprising a push type clutch.

12. A clutch device comprising:
a rotating part capable of rotating around a rotation axis as a center;
a friction disc capable of rotating around the rotation axis as the center along with the rotating part by being pressed against the rotating part;
a pressure plate capable of causing the friction disc to be pressed against the rotating part;
a diaphragm spring comprising a spring main body capable of biasing the pressure plate so as to causing the friction disc to be pressed against the rotating part;
a plurality of plate springs the diaphragm spring comprises being arranged along a circumference having the rotation axis as a center wherein each of the plurality of plate springs comprises an end portion projecting toward the rotation axis and being configured with a free end portion;
a spring contact displacement part comprising at least a first contact face capable of contacting at least one free end portion or a vicinity thereof of at least one of the plurality of spring plates while not contacting another one of the plurality of plate springs and a second contact face capable of contacting at least one free end portion or vicinity thereof of the another one of the plurality of spring plates while not contacting the one of the plurality of spring plates; and
a release device comprising the spring contact displacement part and being capable of moving in one direction along the rotation axis so as to cause transition from a disengaged condition of clutch to a transmitting condition of clutch,
wherein a distance between the first contact face and the respective at least one free end portion or the vicinity thereof is shorter along the one direction than a distance between the second contact face and the respective at least one free end portion or the vicinity thereof in the disengaged condition of clutch.

13. The clutch device according to claim 12 wherein:
the at least one plate spring capable of contacting the first contact face comprises an end portion closer to the rotation axis than any of end portions of other plate springs: and
the first contact face is configured to be capable of contacting the end portion or a vicinity of the at least one plate spring, the first contact face contacting the end portion or the vicinity earlier than other contact faces during transition from the disengaged condition of clutch to the transmitting condition of clutch by displacement in the one direction along the rotation axis.

14. The clutch device according to claim 12 wherein the first contact face and the second contact face are provided on a surface inclined to the one direction.

15. The clutch device according to claim 12 wherein:
the spring contact displacement part further comprises a third contact face;
the plurality of plate springs further comprise at least one plate spring capable of contacting the third contact face: and
in the disengaged condition of clutch, a distance between the third contact face and the at least one free end portion or the vicinity thereof is different from any of a distance between the first contact face and the at least one free end portion or the vicinity thereof and a distance between the second contact face and the at least one free end portion or the vicinity thereof.

16. The clutch device according to claim 12 wherein:
the first contact face comprises an outer edge along a circle having the rotation axis as a center; and
the second contact face comprises an annular shape existing between two concentric circles having the rotation axis as a center and surrounding the outer edge of the first contact face.

17. The clutch device according to claim 12 wherein the plurality of plate springs are provided rotationally symmetrical to the rotation axis as a center with respect to the diaphragm spring.

18. The clutch device according to claim 12 wherein:
at least one plate spring to contact the first contact face and at least one plate spring capable of contacting the second contact face are adjacently arranged so as to form an arrangement unit; and
the plurality of plate springs comprises a configuration where a plurality of arrangement units are arranged equiangularly along a circumference having the rotation axis as a center.

19. The clutch device according to claim 12 wherein a ratio of a number of the at least one plate spring to contact the first contact face and a number of the at least one plate spring to contact the second contact face is from 0.5 to 2.5.

20. The clutch device according to claim 12 comprising a pull type clutch.

21. The clutch device according to claim 12 comprising a push type clutch.

* * * * *